(12) United States Patent
Steinke et al.

(10) Patent No.: US 7,491,779 B2
(45) Date of Patent: Feb. 17, 2009

(54) POLYVINYL ETHERS

(75) Inventors: Joachim Hans Georg Steinke, London (GB); David Alan Pears, Manchester (GB); Gabriel Cavalli-Petraglia, Montevideo (UY)

(73) Assignee: Imperial College of Science, Technology and Medicine, London (GB)

( * ) Notice: Subject to any disclaimer, the term of this patent is extended or adjusted under 35 U.S.C. 154(b) by 259 days.

(21) Appl. No.: 11/004,194

(22) Filed: Dec. 3, 2004

(65) Prior Publication Data

US 2005/0215745 A1    Sep. 29, 2005

Related U.S. Application Data

(63) Continuation-in-part of application No. PCT/GB03/02430, filed on Jun. 3, 2003.

(30) Foreign Application Priority Data

| Jun. 5, 2002 | (GB) | ................................. 0212897.3 |
| Jun. 7, 2002 | (GB) | ................................. 0213125.8 |
| Jun. 18, 2002 | (GB) | ................................. 0213995.4 |

(51) Int. Cl.
    *C08F 16/12*    (2006.01)

(52) U.S. Cl. ........................................ 526/332; 526/333
(58) Field of Classification Search ................. 526/332, 526/333
    See application file for complete search history.

(56) References Cited

U.S. PATENT DOCUMENTS

| 4,886,716 | A | * | 12/1989 | Roggero et al. ............. 429/317 |
| 5,399,631 | A | * | 3/1995 | Egawa et al. ............. 525/328.9 |
| 5,411,819 | A | * | 5/1995 | Marchese et al. ........... 429/317 |
| 5,486,586 | A | * | 1/1996 | Kroener et al. ............. 526/332 |
| 6,235,859 | B1 | * | 5/2001 | Naka et al. ................. 526/332 |

FOREIGN PATENT DOCUMENTS

| EP | 0 312 160 A2 | * | 4/1989 |
| EP | 0312160 | | 4/1989 |
| GB | 1306472 | | 2/1973 |
| JP | 04058153 | | 2/1992 |

* cited by examiner

*Primary Examiner*—Ling-Siu Choi
(74) *Attorney, Agent, or Firm*—Frommer Lawrence & Haug LLP; Thomas J. Kowalski; Angela M. Collison

(57) ABSTRACT

The present invention relates to polyvinyl ethers and to their use as supports for synthetic methods (organic synthesis, peptide synthesis, oligonucleotide synthesis, oligosaccharide synthesis or any other synthetic procedure) and to their use for chromatographic applications (such as affinity chromatography), immobilisation of enzymes, reagents or catalysts.

18 Claims, 6 Drawing Sheets

Reaction Sequence 1:

Z=H, Butyl vinyl ether
Z=OMe, (4-Methoxy) butyl vinyl ether
Z=OAc, (4-Acetoxy) butyl vinyl ether

Reaction Sequence 2:

Reaction Sequence 3:

SLURPS-Ac (1.5)

Condensed representation of SLURPS-Ac (1.5)

Reaction Sequence 4:

Reaction Sequence 5:

Reaction Sequence 6:

POLYVINYL ETHERS

REFERENCE TO RELATED APPLICATIONS

The present application is a continuation-in-part of International Patent Application PCT/GB03/02430 filed Jun. 3, 2003 and published as WO 03/104294 on Dec. 18, 2003, which claims priority from Great Britain Patent Application Nos. 0212897.3 filed Jun. 5, 2002, 0213125.8 filed Jun. 7, 2002, and 0213995.4 filed Jun. 18, 2002.

These applications and publications, and each application and patent mentioned in this document, and each document cited or referenced in each of the above applications and patents, including during the prosecution of each of the applications and patents ("application cited documents") and any manufacturer's instructions or catalogues for any products cited or mentioned in each of the applications and patents and in any of the application cited documents, are hereby incorporated herein by reference. Furthermore, all documents cited in this text, and all documents cited or referenced in documents cited in this text, and any manufacturer's instructions or catalogues for any products cited or mentioned in this text, are hereby incorporated herein by reference.

It is noted that in this disclosure, terms such as "comprises", "comprised", "comprising", "contains", "containing" and the like can have the meaning attributed to them in U.S. Patent law; e.g., they can mean "includes", "included", "including" and the like. Terms such as "consisting essentially of" and "consists essentially of" have the meaning attributed to them in U.S. Patent law, e.g., they allow for the inclusion of additional ingredients or steps that do not detract from the novel or basic characteristics of the invention, i.e., they exclude additional unrecited ingredients or steps that detract from novel or basic characteristics of the invention, and they exclude ingredients or steps of the prior art, such as documents in the art that are cited herein or are incorporated by reference herein, especially as it is a goal of this document to define embodiments that are patentable, e.g., novel, non-obvious, inventive, over the prior art, e.g., over documents cited herein or incorporated by reference herein. And, the terms "consists of" and "consisting of" have the meaning ascribed to them in U.S. Patent law; namely, that these terms are closed ended.

FIELD OF THE INVENTION

The present invention relates to polyvinyl ethers and their synthesis, to the use of such polymers for synthesis (e.g. organic synthesis, peptide synthesis, oligonucleotide synthesis, oligosaccharide synthesis or any other synthetic procedure) and to the use of such polymers for chromatographic applications (such as affinity chromatography), immobilisation of enzymes, reagents or catalysts.

BACKGROUND OF THE INVENTION

Solid-phase synthesis (otherwise known as "SPS") is a well-established method that has revolutionised natural oligomer and small molecule synthesis and allowed for the development of combinatorial techniques and high-throughput drug discovery. Currently more and more articles are being published in the area (e.g. R. E. Dolle, *J. Comb. Chem.*, 2000, 2, 383.; S. E. Hall, *Mol. Diversity*, 1999, 4, 131.).

The seminal work in this area is the famous Merrifield's peptide synthesis on crosslinked polystyrene (R. B. Merrifield, *J. Am. Chem. Soc.*, 1963, 85, 2149.) even if the concept has been envisaged some years before (R. L. Letsinger and S. B. Hamilton, *J. Am. Chem. Soc.*, 1959, 81, 3009.; R. L. Letsinger and M. J. Komet, *J. Am. Chem. Soc.*, 1963, 85, 3045.).

The use of chemically inert, insoluble, crosslinked polymers to assist synthetic transformations has several advantages: most important, the system allows the use of excess reagents to drive reactions to completion which can be easily separated by means of a simple filtration and subsequent washings. For this reason, automation of a complete synthetic sequence in a single vessel has been possible accelerating the synthetic output even at industrial level.

As a consequence the development of improved polymeric supports is of paramount importance to solid-phase synthesis.

After Merrifield's peptide synthesis a wide variety of supports have been developed (e.g. I. Sucholeiki, *Mol. Diversity*, 1999, 4, 25; P. H. Toy, T. S. Reger, and K. D. Janda, *Aldrichimica Acta*, 2000, 33, 87; B. Yan, *Comb. Chem. High Throughput Screening*, 1998, 1, 215; D. Hudson, *J. Comb. Chem.*, 1999, 1, 333; D. Hudson, *J Comb. Chem.*, 1999, 1, 403; M. Meldal, *Methods in Enzymology*, 1997, 289, 83.). Polystyrene supports (cross-linked with divinylbenzene, usually <5%) are quite resistant (both chemically and mechanically) and can provide for high loading levels as each monomer may bear a functional group. Polystyrene polymers have been used as:

lowly-crosslinked gel-type resins (e.g. R. B. Merrifield, *J. Am. Chem. Soc.*, 1963, 85, 2149.; R. L. Letsinger and M. J. Komet, *J. Am. Chem. Soc.*, 1963, 85, 3045.; R. L. Letsinger and V. Mahadevan, *J. Am. Chem. Soc.*, 1965, 87, 3526;. R. L. Letsinger, M. J. Komet, V. Mahadevan, and D. M. Jerina, *J. Am. Chem. Soc.*, 1964, 86, 5163.; R. Arshady, *Makromol. Chem.*, 1988, 189, 1295.; J. H. Adams, R. M. Cook, D. Hudson, V. Jammalamadaka, M. H. Lyttle, and M. F. Songster, *J. Org. Chem.*, 1998, 63, 3706.), macroporous supports (e.g. C. McCollum and A. Andrus, *Tetrahedron Lett.*, 1991, 32, 4069; A. Mercier, H. Deleuze, and 0. Mondain-Monval, *React. Funct. Polym.*, 2000, 46, 67; A. Barbetta, N. R. Cameron, and S. J. Cooper, *Chem. Commun. (Cambridge)*, 2000, 221;Y. H. Chang and W. T. Ford, *Journal of Organic Chemistry*, 1981, 46, 5364; M. Hori, D. J. Gravert, P. Wentworth, Jr., and K. D. Janda, *Bioorg. Med. Chem. Lett.*, 1998, 8, 2363.), and even in a linear, soluble format (e.g. P. H. Toy and K. D. Janda, *Acc. Chem. Res.*, 2000, 33, 546; D. J. Gravert and K. D. Janda, *Chem. Rev.*, 1997, 97, 489).

They have been used in different physical formats such as beads, monoliths (e.g. A. Mercier, H. Deleuze, and O. Mondain-Monval, *React. Funct. Polym.*, 2000, 46, 67.) and discs (e.g. N. Hird, I. Hughes, D. Hunter, M. G. J. T. Morrison, D. C. Sherrington, and L. Stevenson, *Tetrahedron*, 1999, 55, 9575).

Nevertheless, solvent compatibility for polystyrene is low due to the hydrophobic nature of the polymer. This is particularly relevant for gel-type resins that need to swell well in the reaction solvent, or solvent mixture, to allow diffusion of reagents/substrates to the polymer bound substrates/reagents.

To improve these features several chemically different types of polymers were developed. Most successful alternatives for Merrifield resins being:

polyethylene glycol-(PEG)-containing polystyrene (PS) supports such as:
- Tentagel (e.g. E. Bayer and W. Rapp, U.S. Pat. No. 4,908,405.; A. W. Czarnik, *Biotechnol. Bioeng.*, 1998, 61, 77; Y. Feng and K. Burgess, *Biotechnol. Bioeng.*, 2000, 71, 3; W. B. Li and B. Yan, *J. Org. Chem.*, 1998, 63, 4092),
- Argogel (e.g. J. W. Labadie, J. A. Porco and O. W. Gooding, WO 97 27226.; O. W. Gooding, S. Baudart, T. L. Deegan, K. Heisler, J. W. Labadie, W. S. Newcomb, J. A. Porco, and P. van Eikeren, *J. Combi. Chem.*, 1999, 1, 113; A. W. Czarnik, *Biotechnol. Bioeng*, 1998, 61, 77; Y. Feng and K. Burgess, *Biotechnol. Bioeng.*, 2000, 71, 3; Argonaut Technologies web-page: http://www.argotech.com),
- Novagel (e.g. Y. Feng and K. Burgess, *Biotechnol. Bioeng.*, 2000, 71, 3; Novabiochem web-page: http://www.novabiochem.com), non-divinyl benzene (DVB) crosslinked PS polymers such as:
- POEPS (e.g. M. Meldal, J. Buchardt and J. Rademann, WO 00 18823.; J. Buchardt and M. Meldal, *Tetrahedron Lett.*, 1998, 39, 8695; M. Grotli, C. H. Gotfredsen, J. Rademann, J. Buchardt, A. J. Clark, J. O. Duus, and M. Meldal, *J. Combi. Chem.*, 2000, 2, 108; M. Renil and M. Meldal, *Tetrahedron Lett.*, 1996, 37, 6185);
- and JandaJel supports (e.g. P. H. Toy and K. D. Janda, *Tetrahedron Lett.*, 1999, 40, 6329; P. H. Toy, T. S. Reger, and K. D. Janda, *Aldrichimica Acta*, 2000, 33, 87)

acrylamides polymers e.g. E. Atherton, D. L. J. Clive, and R. C. Sheppard, *J. Am. Chem. Soc.*, 1975, 97, 6584.; R. Arshady, E. Atherton, D. L. J. Clive, and R. C. Sheppard, *J. Chem. Soc., Perkin Trans.* 1, 1981, 529; J. T. Sparrow, P. Kanda and R. C. Kennedy, U.S. Pat. No. 4,973,638) such as polydimethylacrylamide (PDMA) gels, PEG-containing acrylamide supports, such as:
- PEGA resins (e.g. M. Meldal, U.S. Pat. No. 5,352,756.; M. Meldal, *Tetrahedron Lett.*, 1992, 33, 3077; M. Meldal, F. -I. Auzanneau, O. Hindsgaul, and M. M. Palcic, *J. Chem. Soc., Chem. Commun.*, 1994, 1849; M. Meldal and I. Svendsen, *J. Chem. Soc., Perkin Trans.* 1, 1995, 1591; M. Renil and M. Meldal, *Tetrahedron Lett.*, 1995, 36, 4647)

and all-PEG supports such as:
- SPOCC (e.g. M. Meldal, J. Buchardt and J. Rademann, WO 00 18823.; J. Rademann, M. Grotli, M. Meldal, and K. Bock, *J. Am. Chem. Soc.*, 1999, 121, 5459; M. Grotli, J. Rademan, T. Groth, W. D. Lubell, L. P. Miranda, and M. Meldal, *J. Comb. Chem.*, 2001, 3, 28; M. Grotli, C. H. Gotfredsen, J. Rademann, J. Buchardt, A. J. Clark, J. 0. Duus, and M. Meldal, *J. Combi. Chem.*, 2000, 2, 108)
- and POEPOP (e.g. M. Renil and M. Meldal, *Tetrahedron Lett.*, 1996, 37, 6185; M. Grotli, C. H. Gotfredsen, J. Rademann, J. Buchardt, A. J. Clark, J. O. Duus, and M. Meldal, *J. Combi. Chem.*, 2000, 2, 108; M. Grotli, J. Rademan, T. Groth, W. D. Lubell, L. P. Miranda, and M. Meldal, *J. Comb. Chem.*, 2001, 3, 28).

Tentagel and related PEG-PS supports (Argogel and Novagel) are PEG-grafted PS polymers. The differences between these kinds of polymers lie in the structure of the graft bonds, the quantity of PEG chains per styrene monomer and the position of the functional site (at the end of the PEG chain or next to the aromatic ring). The amphiphilic towards hydrophilic and flexible nature of the PEG chains provides a good environment for reactions to take place and the PEG-grafted PS can swell well in both polar and non-polar solvents (from $CH_2Cl_2$ to water). As a disadvantage, the loading levels decrease dramatically from the PS supports, which for Merrifield resins can be up to 6.5 mmol/g resin, achieving at the most 1 mmol/g resin but normally much lower loading levels.

By grafting PEG chains the swelling behaviour of PS resins has been improved but at the cost of dramatically decreasing loading levels: a feature that has been repeated in support development.

Another way of improving the swelling properties of PS supports has been to use a crosslinker more flexible and hydrophilic than DVB. Two examples are POEPS resins and JandaJel. POEPS are PEG-crosslinked PS polymers. Their features are similar to PEG-grafted PS supports though, in theory, they allow for slightly higher loading levels.

JandaJel incorporates an oligomeric polytetrahydrofuran crosslinker which renders the resin more swellable in DMF and other polar aprotic solvents. Whilst this crosslinker allows the support to retain high loading levels it does not achieve a significant change in swelling properties since swelling is negligible in lower alcohols and water.

Alternatively, by changing completely the monomer to one that can present a functional polar side chain, capable of producing a polymer with excellent swelling properties and high loading levels, it was possible to produce a better support. For example, polyacrylamide resins possess good swelling in polar solvents and allow high loading levels constituting the best supports in solid-phase peptide synthesis (SPPS), especially for Fmoc chemistry. Nevertheless, their use is limited since amide bonds are chemically reactive in a wide variety of common organic reactions and therefore cannot be used for solid-phase organic synthesis (SPOS).

PEGA resins are acrylamide resins which include a PEG-containing crosslinker. Their features are similar to polyacrylamide resins.

So far, polyethers have proved the best option to produce supports with the chemical stability needed for SPOS applications and good swelling properties. This is the case of the "all PEG"-supports (such as SPOCC and POEPOP). They are constituted of functionalised crosslinked PEG. These polymers swell very well across a wide range of solvent polarities and are chemically resistant so that they can be used in SPOS. Nevertheless the loading levels achieved with these supports is low (typically far below 1 mmol/g resin) and their method of synthesis does not allow for a high control in functionality level or crosslinking level as it is carried out by the polymerisation of a non purified mixture of macromonomers and macrocrosslinkers.

The inspection of the features of available polymeric supports for synthetic applications shows that there is still the need for the development of a novel resin capable of fast swelling kinetics and high degrees of swelling in polar and apolar solvents, possessing chemical stability under a wide variety of reaction conditions to be compatible with SPPS, oligonucleotide synthesis and SPOS and with the possibility of high levels of control over the loading level. Ideally this support should also be able to be produced via the copolymerisation of different comonomers in a controlled and easy manner that would allow the presence of different functional groups in the desired ratio to be used for orthogonal processes.

Chemically stable off-the-shelf supports that interact well with a wide range of solvents have low loading levels (usually below 1 mmol/g) whereas supports with high loading levels are limited to a narrow range of suitable solvent systems (I. Sucholeiki, *Mol. Diversity*, 1999, 4, 25; P. H. Toy, T. S. Reger, and K. D. Janda, *Aldrichimica Acta*, 2000, 33, 87; B. Yan, *Comb. Chem. High Throughput Screening*, 1998, 1, 215; D. Hudson, *J. Comb. Chem.*, 1999, 1, 333; D. Hudson, *J. Comb. Chem.*, 1999, 1, 403; M. Meldal, *Methods in Enzymology*, 1997, 289, 83.). Support development has shown that polyether supports (usually but not necessarily PEG-derived) exhibit good swelling properties combined with good chemical stability. On the other hand, vinyl monomers can provide for side chain functional sites allowing high loading levels and high degree of control of these loading levels. In addition copolymerisation of different vinyl monomers allow the inclusion of a diverse range of functional sites in the final support. All of these characteristics are common to a unique type of monomers: vinyl ethers.

The present invention seeks to provide a support that possesses these characteristics and thereby overcomes the problems associated with the known polymeric supports.

BROAD SUMMARY OF THE INVENTION

In a broad aspect, the present invention relates to a polymer that is stable and solvent compatible enough for Solid-Phase Organic Synthesis (SPOS) and has the ability of controlling the desired loading level, preferably up to 8.5 mmol functionality/g resin.

SPECIFIC ASPECT

In one specific aspect, the present invention provides a polymer obtainable by a polymerisation process which comprises polymerising a polymerisation mixture, wherein said polymerisation mixture comprises one or more monomers of formula (I)

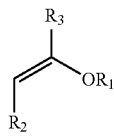

(I)

wherein $R_1$ is a hydrocarbyl group;

$R_2$ is hydrogen or a hydrocarbyl group; and $R_3$ is hydrogen or a hydrocarbyl group.

In another specific aspect, the present invention provides a polymer comprising units represented by the formula (VII):

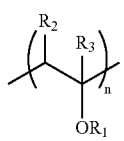

(VII)

wherein $R_1$ is a hydrocarbyl group;

$R_2$ and $R_3$ are independently selected from hydrogen or a hydrocarbyl group.

In another specific aspect, the present invention provides a polymer which has a network represented by formula (III):

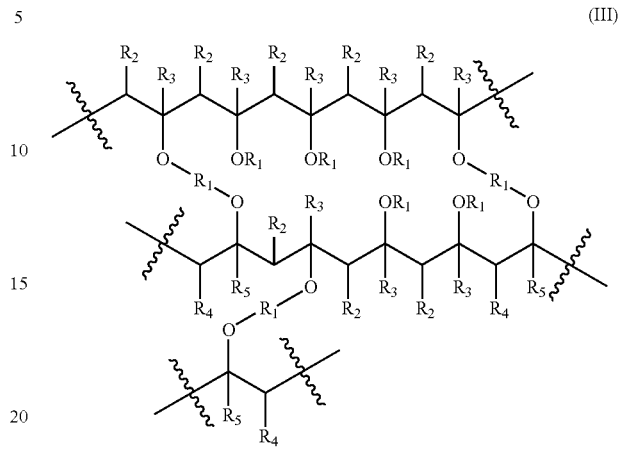

(III)

wherein $R_1$ is a hydrocarbyl group; and $R_2$, $R_3$, $R_4$, and $R_5$ are independently hydrogen or a hydrocarbyl group.

In another specific aspect, the present invention provides a polymer which has a network represented by formula (VI):

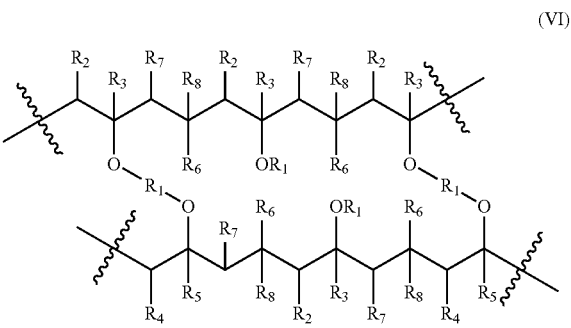

(VI)

wherein $R_1$ is a hydrocarbyl group;

$R_2$, $R_3$, $R_4$, and $R_5$ are independently hydrogen or a hydrocarbyl group;

$R_6$ is an electron withdrawing group; and $R_7$ and $R_8$ are independently hydrogen or an electron withdrawing group.

In another specific aspect, the present invention provides a process for producing a polymer according to the present invention, which process comprises dissolving appropriate monomer(s), in the desired feed ratio, in appropriate solvent(s) and polymerising said monomer(s).

In another specific aspect, the present invention provides a process for producing a polymer according to the present invention, which process comprises dissolving appropriate monomer(s), in the desired feed ratio, in appropriate solvent(s)

for cationic polymerisation of vinyl ethers, and polymerising said monomer(s) using initiator(s) for cationic polymerisation of vinyl ethers.

ADVANTAGES OF THE INVENTION

The polymers of the present invention (e.g. the polymer supports of the present invention) have fast swelling kinetics and have high degrees of swelling in polar and apolar solvents.

The polymers of the present invention (e.g. the polymer supports of the present invention) possess chemical stability under a wide variety of reaction conditions to be compatible with SPPS, oligonucleotide synthesis and SPOS.

The polymers of the present invention (e.g. the polymer supports of the present invention) have high levels of control over loading levels.

The swelling behaviour of the polymers of the present invention are hitherto unknown.

The polymers of the present invention are stable enough for Solid-Phase Organic Synthesis (SPOS).

The polymers of the present invention also have the ability of controlling the desired loading level, preferably up to 8.5 mmol functionality/g resin.

Given their swelling characteristics, the polymers of the present invention may be called "SLURPS" (Superior Liquid-Uptake Resins for Polymer-supported Synthesis).

These, and other advantages, are mentioned in, and are apparent from, the following teachings.

PREFERABLE ASPECTS

For some aspects of the present invention, preferably $R_1$ is an ether, which ether may be monomeric or oligomeric and/or which ether may be branched, hyperbranched, grafted, dendritic or linear.

For some aspects of the present invention, preferably $R_2$ and $R_3$ are independently selected from hydrogen and an ether, which ether may be monomeric or oligomeric and/or which ether may be branched, hyperbranched, grafted, dendritic or linear.

For some aspects of the present invention, preferably said polymerisation mixture comprises one or more crosslinkers having the formula (II):

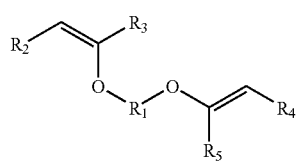

(II)

wherein
  $R_1$ is a hydrocarbyl group; and
  $R_2$, $R_3$, $R_4$ and $R_5$ are independently selected from hydrogen and a hydrocarbyl group.

For some aspects of the present invention, preferably said polymer comprises one or more units of the general formula (VII):

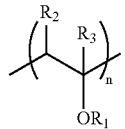

(VII)

wherein
  $R_1$ is a hydrocarbyl group; and
  $R_2$ and $R_3$ are independently selected from hydrogen and a hydrocarbyl group.

For some aspects of the present invention, preferably said one or more monomers of formula (I) have the formula (IV)

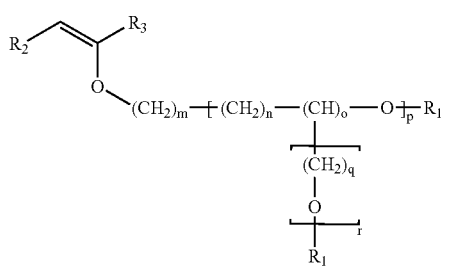

(IV)

wherein
  $R_3$ is hydrogen;
  $R_1$ and $R_2$ are as defined in claim 1;
  m, n, o, p, q and r are integers
    wherein
    m, n, o, p, q and r are integers
      wherein:
      $0 \leq m \leq 3$
      $0 \leq n \leq 10$
      $0 \leq o \leq 8$
      $1 \leq p \leq 10$
      $0 \leq q \leq 10$
      $0 \leq r \leq 10$.

For some aspects of the present invention, preferably the monomer of formula (IV) is produced using corresponding crosslinker of formula (II) as defined in claim 4 or any claim dependent thereon.

For some aspects of the present invention, preferably said polymerisation mixture comprises one or more electron-deficient olefin of formula (V):

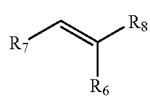

(V)

wherein
  $R_6$ is an electron withdrawing group;
  $R_7$ is hydrogen or an electron withdrawing group; and
  $R_8$ is hydrogen or an electron withdrawing group.

For some aspects of the present invention, preferably said polymer is formed by bulk polymerisation.

For some aspects of the present invention, preferably said polymer is a beaded crosslinked copolymer made by reverse suspension- or spray-polymerisation.

For some aspects of the present invention, preferably said polymer is a beaded crosslinked polymer made by polymerisation of droplets in silicon oil.

For some aspects of the present invention, preferably said polymer has a controlled and suitable loading level preferably up to 8.5 mmol/g.

For some aspects of the present invention, preferably said polymer comprises one or more functional groups or one or more spacer groups for the attachment of at least one C/MOI.

For some aspects of the present invention, preferably said polymer has attached thereto one or more C/MOI.

Polymer:

The polymer of the present invention is obtainable by polymerising polymerisable monomers that comprise one or more groups selected from hydrogen and a hydrocarbyl group. The monomers may be the same or different.

Polymerisation Process:

The polymerisation process for preparing the polymer may be any suitable polymerisation process. Examples of suitable polymerisation processes include radical polymerisation, cationic polymerisation, bulk polymerisation, reverse suspension-polymerisation, spray-polymerisation, and combinations thereof.

For the polymerisation procedure, monomers as described above in the desired feed ratio will typically be dissolved in an appropriate solvent for cationic polymerisation of vinyl ethers, such as, but not limited by, dichloromethane, 1,2-dichloroethane, toluene, acetonitrile, xylene, chlorobenzene, anisol, supercritical $CO_2$ or ionic liquids.

The polymerisation temperatures may be any temperature from below room temperature (such as 0° C. or below) to about 120° C. or even above about 120° C. depending on the monomers, initiators and solvents used as is known to those skilled in the art.

For some embodiments, the polymerisation temperatures are normally, but not limited to, below room temperature depending on the monomers, initiators and solvents used in the art of cationic and living cationic polymerisation (see references above).

For other embodiments, polymerisation temperatures are between room temperature and 120° C. depending on the monomers, initiators and solvents used as is known to those skilled in the art.

If necessary, the polymerisation procedure may require the exclusion of water or any other nucleophiles, as commonly known for cationic polymerisation of vinyl ethers and is known to those skilled in the art of cationic and living cationic polymerisation.

If necessary, the polymerisation procedure may require the exclusion of oxygen or any other radical quencher, as commonly known in the art of free-radical or living free-radical polymerisation.

Polymerisation Ingredients:

The ingredients for the polymerisation process include at least one or more polymerisable monomers that comprise one or more groups selected from hydrogen and a hydrocarbyl group. In addition, the ingredients for the polymerisation process may also include one or more components that are suitable for the polymerisation process. Examples of components include one or more initiators, one or more catalysts, one or more stabilisers, one or more solvents etc.

Initiators may be any commonly used initiator for cationic polymerisation of vinyl ethers (e.g. J. E. Puskas and G. Kaszas, *Prog. Polym. Sci.*, 2000, 25, 403; M. Sawamoto and T. Higashimura, *Makromol. Chem., Macromol. Symp.,* 1986, 3, 83; C. Decker, C. Bianchi, D. Decker, and F. Morel, *Prog. Org. Coat.*, 2001, 42, 253; M. Sawamoto and T. Higashimura, *Makromol. Chem., Macromol. Symp.,* 1991, 47, 67; M. Sawamoto and T. Higashimura, *Makromol. Chem., Macromol. Symp.,* 1990, 32, 131; J. V. Crivello, J. L. Lee, and D. A. Conlon, *Makromol. Chem., Macromol. Symp.,* 1988, 134, 145; T. Higashimura, S. Aoshima, and M. Sawamoto, *Makromol. Chem., Macromol. Symp.,* 1988, 13-4, 457.) such as, but not limited by, triflic acid, $TiCl_4$, $BF_3$—$OEt_2$, $BF_3$, $BCl_3$, $SnCl_4$, $H_2SO_4$, $HI/I_2$, $AlCl_3$, $ZnBr_2$ or any other Lewis acid, with or without the use of other co-reagents such as tertiary amines as is known to those skilled in the art of cationic and living cationic polymerisation.

Initiators may be any commonly used initiator for radical polymerisation such as, but not limited by, AIBN (Azoisobutyronitrile), BPO (Benzoyl peroxide), potassium persulfate and UV radiation or any other method commonly used as is known to those skilled in the art of free-radical and living free-radical polymerisation.

Post-Polymerisation Process:

Post-polymerisation, the polymer will be typically cleaned and purified. Optionally, the polymer may be further subjected to treatment steps—such as smashing and/or exposure to a C/MOI or components thereof or components for the synthesis thereof.

If desired, the crosslinked polymers can be smashed (i.e. broken) and sieved post-polymerisation to the desired particle size. Beads can be obtained by suspension or emulsion polymerisation using inverse-phase suspension polymerisation techniques (e.g. D. C. Sherrington, *Chem. Commun.*, 1998, 2275; M. Grotli, J. Rademan, T. Groth, W. D. Lubell, L. P. Miranda, and M. Meldal, *J. Comb. Chem.*, 2001, 3, 28; P. J. Dowding and B. Vincent, *Coll. Surf. A-Physicochem. Eng. Asp.*, 2000, 161, 259; E. VivaldoLima, P. E. Wood, A. E. Hamielec, and A. Penlidis, *Ind. Eng. Chem. Res.*, 1997, 36, 939; R. Arshady, *J. Chrom.*, 1991, 586, 181; R. Arshady, *J. Chrom.*, 1991, 586, 199; H. G. Yuan, G. Kalfas, and W. H. Ray, *J. Macromol. Sci. Rev. Macromol. Chem. Phys.*, 1991, C31, 215.), for example, using a mineral oil as suspension phase with or without organic co-solvent, and with or without a droplet stabiliser such as linear polymers, surfactants or detergents.

Beaded Polymers:

The polymers according to the present invention may, for example, be beaded crosslinked polymers made by reverse-suspension- or spray-polymerisation.

The polymers according to the present invention may, for example, be beaded crosslinked polymers made by polymerisation of droplets in silicon oil.

The polymers according to the present invention may, for example, be beaded crosslinked polymers made by spray-polymerisation in a hot inert gas.

Hydrocarbyl Group:

Each hydrocarbyl group can be a substituted or unsubstituted hydrocarbon group.

Each hydrocarbyl group can have a linear, branched or cyclic structure, or combinations thereof.

Each hydrocarbyl group may contain heteroatoms or heterogroups in the linear, branched or cyclic structure.

Typically, each hydrocarbyl group is one or more of: alkyl, aryl, arylalkyl, alicyclic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process.

The group may optionally be a monomeric or oligomeric structure (branched, hyperbranched, grafted, dendritic or linear).

The group may optionally comprise a spacer molecule capable of bearing functional groups for the attachment of compounds/molecule of interest—in particular biological compounds/molecules of interest—such as peptides, proteins, nucleotides, saccharides, small organic compounds and ligands.

Preferably the hydrocarbyl groups are independently selected from one or more of alkyl, aryl, arylalkyl, alicyclic, heteroaryl, heterocyclic, substituted alkyl, substituted aryl, substituted alicyclic, substituted heteroaryl, substituted heterocyclic or substituted arylalkyl group, these groups being substituted with alkyl, hydroxy, mercapto, nitro, amino, mono-, di- or trialkylamino, halogen, carboxyl, carbonyl, alkoxy or any derivatives thereof.

The or each hydrocarbyl group may optionally be protected for the purpose of the polymerisation process.

The hydrocarbyl groups may independently comprise up to about 100 carbon atoms. Typically the hydrocarbyl groups may independently comprise up to about 50 carbon atoms. More typically the hydrocarbyl groups may independently comprise up to about 25 carbon atoms. More typically the hydrocarbyl groups may independently comprise up to about 20 carbon atoms. More typically the hydrocarbyl groups may independently comprise up to about 12 carbon atoms.

The hydrocarbyl groups are independently selected from a monomeric or oligomeric structure—which may be branched, hyperbranched, grafted, dendritic or linear.

The or each hydrocarbyl group may comprise a spacer molecule capable of bearing functional groups for the attachment of one or more C/MOI.

Crosslinker:

The crosslinker used in the present invention may be any suitable crosslinker.

The crosslinker(s) may, for example, be selected from 1,4-butanediol divinyl ether or any derivatives thereof containing alkyl, aryl, arylalkyl, alicyclic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, conveniently protected for the purpose of the polymerisation reaction.

The crosslinker(s) may, for example, be selected from ethylene glycol divinyl ether, 1,3-propanediol divinyl ether, 1,5-pentadiol divinyl ether, 1,6-hexanediol divinyl ether, 1,7-heptanediol divinyl ether, 1,8-octanediol divinyl ether, diethylene glycol divinyl ether, triethylene glycol divinyl ether, tetraethylene glycol divinyl ether or any derivatives thereof containing alkyl, aryl, arylalkyl, alicyclic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, conveniently protected for the purpose of the polymerisation reaction.

Preferably, levels of crosslinking will vary between 0.5% and 10% of crosslinker (e.g. crosslinker (II)), but other levels of crosslinking and even no crosslinking at all are also covered within the scope of this invention.

Compounds/Molecules of Interest:

The polymer of the present invention may contain groups to which may be attachable, to to which may be attached, compounds/molecules of interest.

In particular the compounds/molecules of interest include compounds or molecules such as peptides, proteins, nucleotides, saccharides, small organic compounds and ligands.

In one preferred aspect, the compounds/molecules of interest are biological compounds or molecules of interest—such as peptides, proteins, nucleotides, saccharides, small organic biological compounds and biological ligands.

The compounds/molecules of interest may be one or more of: natural compounds or natural molecules, modified natural compounds or modified natural molecules, derivatives of natural compounds or derivatives of natural molecules, fragments of natural compounds or fragments of natural molecules, synthetic compounds or synthetic molecules, derivatives of synthetic compounds or derivatives of synthetic molecules, fragments of synthetic compounds or fragments of synthetic molecules, compounds or molecules prepared by use of recombinant DNA techniques, or combinations of any thereof.

Examples of compounds/molecules of interest include enzymes, reagents or catalysts.

The attached compounds/molecules of interest may be the same or different.

For ease of reference herein, the term "compound/molecule of interest" may be referred to as a "C/MOI".

Functional/Spacer Groups:

When the polymer of the present invention is to be used as a solid support for the synthesis of a C/MOI—e.g. peptides, oligonucleotides, oligosaccharides, small organic compounds or ligands—or as a substrate for the immobilisation of a C/MOI—e.g. proteins, ligands or catalysts—the polymer will typically incorporate a functional group or spacer for the attachment of the C/MOI.

Typically the functional group or spacer may comprise one or more of the following groups: hydroxy, mercapto, nitro, amino, mono-, di- or trialkylamino, halogen, carboxyl, carbonyl, alkoxy or any derivatives thereof.

The functional group or spacer can be monomeric or oligomeric (branched, hyperbranched, grafted, dendritic or linear).

These polymers may, on their own turn, be conveniently functionalised with an appropriate linker such as those used for the synthesis of a C/MOI—e.g. peptides, oligonucleotides, oligosaccharides, small organic compounds or ligands.

Typical—but not limiting—examples fo linkers include one or more of: Wang, Trityl, Oxime, Rink, HMPA and other linkers as described in the literature (e.g. A. C. Comely and S. E. Gibson, *Angew. Chem., Int. Ed.,* 2001, 40, 1012; S. Aimoto, *Curr. Org. Chem.,* 2001, 5, 45; F. Guillier, D. Orain, and M. Bradley, *Chem. Rev.,* 2000, 100, 2091; K. Gordon and S. Balasubramanian, *J. Chem. Technol. Biotechnol.,* 1999, 74, 835; I. W. James, *Tetrahedron,* 1999, 55, 4855; H. M. Eggenweiler, *Drug Discovery Today,* 1998, 3, 552; M. Meisenbach, H. Echner, and W. Voelter, *Chimica Oggi-Chemistry Today,* 1998, 16, 67; B. Merrifield, *Methods in Enzymology,* 1997, 289, 3; J. M. Stewart, *Methods in Enzymology,* 1997, 289, 29; D. A. Wellings and E. Atherton, *Methods in Enzy-* mology, 1997, 289, 44; M. F. Songster and G. Barany, *Methods in Enzymology*, 1997, 289, 126.).

For the incorporation of functional sites, the polymer may be synthesised by copolymerisation of none, one or more structural monomers, one or more functional monomers and none, one or more crosslinkers. For structural monomer it is understood any monomer of structure (I) or (IV) where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group these groups being substituted with alkyl or any derivatives thereof which cannot be easily further functionalised by reactions commonly used in organic synthesis and $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group these groups being substituted with alkyl or any derivatives thereof which cannot be easily further functionalised by reactions commonly used in organic synthesis.

A functional monomer is any monomer of structure (I) or (IV) where $R_1$ contains hydroxy, mercapto, amino, halogen, carboxyl, carbonyl and any derivatives thereof or any other group that can easily be further functionalised by reactions commonly used in organic synthesis and where these groups are, if needed, conveniently protected for the purpose of the polymerisation reaction, and $R_2$ and $R_3$ are independently hydrogen or contain hydroxy, mercapto, amino, halogen, carboxyl, carbonyl or any derivatives thereof or any other group that can easily be further functionalised by reactions commonly used in organic synthesis and where these groups are, if needed, conveniently protected for the purpose of the polymerisation reaction. Through this copolymerisation procedure, the loading levels can be conveniently adjusted from the feed ratio in the polymerisation process and will be, preferably, higher than 1 mmol functional site/g final resin better than hitherto possible for polar resins for SPOS.

Uses:

The polymers according to the present invention may, for example, be used:

a). as a support for the synthesis of peptides, oligonucleotides, oligosaccharides, small organic compounds, catalysts or ligands or as a substrate for the immobilisation of proteins, ligands or catalysts;

b). as a support for separation processes such as, but not limited by, affinity chromatography;

c). as a support for solid-phase enzymatic reactions, for example, in which the enzyme interacts with a substrate or an inhibitor linked to the support; or.

d) as a support for peptide, protein, DNA, or RNA ligation through a covalent, ionic, hydrogen bond or any other chemical or physical interaction, for example, in which said other chemical or physical interaction is molecular recognition, supramolecular interactions or physical trapping.

The present invention also relates to the use of the polymers according to the invention wherein the use involves release of a drug bound to the support, for example, use in which the release is mediated by an enzyme.

The polymers according to the present invention may, for example, also be used for combinatorial chemistry.

DETAILED DESCRIPTION OF THE INVENTION

Support development has shown that polyether supports exhibit good swelling and chemical stability properties while vinyl monomers can provide for side chain functional sites allowing high loading level control and copolymerisation processes.

Both characteristics are common to a unique type of monomers: vinyl ethers.

The present invention concerns the synthesis of vinyl ether-containing polymers and their application in synthetic procedures, immobilisation of proteins, ligands, small molecules, reagents and catalysts, chromatographic applications, diagnostics and biotechnological methods. The polymer was constructed: to be chemically stable so as to be capable of being used for SPOS and other synthetic processes; so as to provide good swelling behaviour across a wide range of solvent polarities; and at the same time to provide high loading levels, and loading level and functionality control. Atom economy within the polymer backbone achieves not only higher chemical stability but also spectroscopic transparency (UV, IR) for monitoring during synthetic processes and also requires simple monomers.

By producing a material that combines the major requirements of solid supports there is the opportunity not only for product rationalisation, since these unique supports combine the properties that allow multiple uses and applications, but also to envisage product extension since these supports overcome the features that so far have limited the range of possible applications for polymer supports.

In one aspect of the present invention there is provided a polymer obtainable by a process comprising polymerisation of one or more monomer of formula (I)

(I)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently a monomeric or oligomeric structure (branched, hyperbranched, grafted, dendritic or linear) and $R_2$ and $R_3$ optionally independently comprise a spacer molecule capable of bearing functional groups for the attachment of one or more C/MOI and comprising units of the general formula (VII):

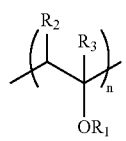

(VII)

In another aspect, the present invention provides a polymer which is formed by cationic copolymerisation of conveniently substituted vinyl ethers of the formula (I):

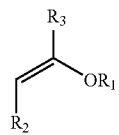

(I)

where $R_1$ is a hydrocarbyl group (e.g. an alkyl, aryl, arylalkyl, alicyclic, heteroaryl, heterocyclic, substituted alkyl, substituted aryl, substituted alicyclic, substituted heteroaryl, substituted heterocyclic or substituted arylalkyl group, these groups being substituted with alkyl, hydroxy, mercapto, nitro, amino, mono-, di- or trialkylamino, halogen, carboxyl, carbonyl, alkoxy or any derivatives thereof and optionally being conveniently protected for the purpose of the polymerisation process; and where $R_1$ is a monomeric or oligomeric structure (branched, hyperbranched, grafted, dendritic or linear) and $R_1$ may comprise a spacer molecule capable of bearing functional groups for the attachment of one or more C/MOI)
and where $R_2$ and $R_3$ are independently hydrogen or a hydrocarbyl group (e.g. alkyl, aryl, arylalkyl, alicyclic, heteroaryl, heterocyclic, substituted alkyl, substituted aryl, substituted alicyclic, substituted heteroaryl, substituted heterocyclic or substituted arylalkyl group, these groups being substituted with alkyl, hydroxy, mercapto, nitro, amino, mono-, di- or trialkylamino, halogen, carboxyl, carbonyl, alkoxy or any derivatives thereof and optionally conveniently protected for the purpose of the polymerisation process);

and where $R_2$ and $R_3$ are independently hydrogen or a monomeric or oligomeric structure (branched, hyperbranched, grafted, dendritic or linear) and $R_2$ and $R_3$ may independently comprise a spacer molecule capable of bearing functional groups for the attachment of one or more C/MOI with crosslinkers, e.g. crosslinkers of the formula (II):

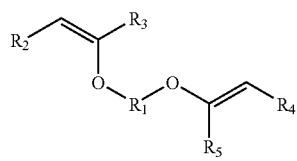

(II)

where $R_1$ is a hydrocarbyl group (e.g. an alkyl, aryl, arylalkyl, alicyclic, heteroaryl, heterocyclic, substituted alkyl, substituted aryl, substituted alicyclic, substituted heteroaryl, substituted heterocyclic or substituted arylalkyl group, these groups being substituted with alkyl, hydroxy, mercapto, nitro, amino, mono-, di- or trialkylamino, halogen, carboxyl, carbonyl, alkoxy or any derivatives thereof and optionally conveniently protected for the purpose of the polymerisation process);

and where $R_1$ is a monomeric or oligomeric structure (branched, hyperbranched, grafted, dendritic or linear) and $R_1$ may comprise a spacer molecule capable of bearing functional groups for the attachment of one or more C/MOI
and where $R_2$, $R_3$, $R_4$ and $R_5$ are independently hydrogen or a hydrocarbyl group (e.g. alkyl, aryl, arylalkyl, alicyclic, heteroaryl, heterocyclic, substituted alkyl, substituted aryl, substituted alicyclic, substituted heteroaryl, substituted heterocyclic or substituted arylalkyl group, these groups being substituted with alkyl, hydroxy, mercapto, nitro, amino, mono-, di- or trialkylamino, halogen, carboxyl, carbonyl, alkoxy or any derivatives thereof and optionally conveniently protected for the purpose of the polymerisation process);

and where $R_2$ and $R_3$ are independently hydrogen or a monomeric or oligomeric structure (branched, hyperbranched, grafted, dendritic or linear) and $R_2$, $R_3$, $R_4$ and $R_5$ may independently comprise a spacer molecule capable of bearing functional groups for the attachment of one or more C/MOI.

Without wishing to be bound by theory, an illustrative drawing of the network typically formed by copolymerisation of monomers of formula (I) and (II) is shown in formula (III):

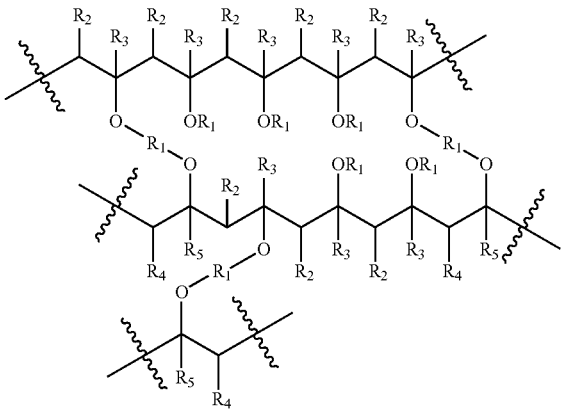

(III)

Preferred structures for $R_1$ groups in formula (I) are, but not limited by, either monomeric or oligomeric ethers (branched, hyperbranched, grafted, dendritic or linear), and preferably $R_2$ and $R_3$ are independently hydrogen or either monomeric or oligomeric ethers (branched, hyperbranched, grafted, dendritic or linear).

Preferred structures for monomers are also those producing monomers of formula (IV) with their corresponding crosslinkers (II):

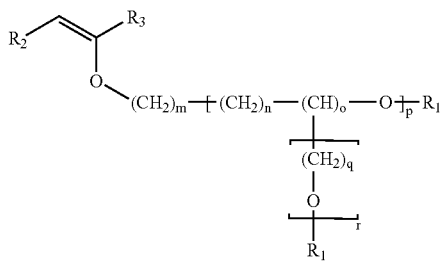

(IV)

where $R_3$ is hydrogen, $R_1$ and $R_2$ are as described before, m, n, o, p, q and r are integers; wherein: $0 \leq m \leq 3$; $0 \leq n \leq 10$; $0 \leq o \leq 8$; $1 \leq p \leq 10$; $0 \leq q \leq 10$; and $0 \leq r \leq 10$.

The monomer(s) may, for example be selected from 1,4-butanediol vinyl ether, butyl vinyl ether or any derivatives thereof containing containing groups such as alkyl, aryl, arylalkyl, substituted alkyl, substituted aryl, or substituted arylalkyl groups, these groups being substituted with alkyl or any derivatives, hydroxy, mercapto, amino, halogen, carboxyl, carbonyl and any derivatives thereof or any other group that can easily be further functionalised by reactions commonly used in organic synthesis and where these groups are, optionally, conveniently protected for the purpose of the polymerisation reaction.

The monomer(s) may, for example be selected from ethyleneglycol vinyl ether, ethyl vinyl ether or any derivatives thereof containing alkyl, aryl, arylalkyl, alicylic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, conveniently protected for the purpose of the polymerisation reaction.

Therefore, this aspect also includes a polymer prepared by a process comprising polymerisation of one or more monomer of formula (I)

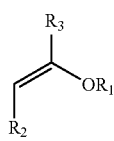

(I)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being conveniently protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being conveniently protected for the purpose of the polymerisation process; and where $R_2$ and $R_3$ optionally are independently a monomeric or oligomeric structure (branched, hyperbranched, grafted, dendritic or linear) and $R_2$ and $R_3$ optionally independently comprise a spacer molecule capable of bearing functional groups for the attachment of one or more C/MOI and comprising units of the general formula (VII):

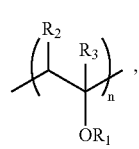

(VII)

and the polymer preferably having the general formula (VII). The monomer(s) may, for example, have the formula (IV) as defined above.

Preferably the crosslinkers are as defined before but other crosslinkers are also within the scope of this invention. The format of the final support will therefore be soluble polymers, macrogels, microgels or macroporous supports.

Different levels of comonomers of different structure according to formulas (I) and (IV), other than crosslinkers, are also possible in a wide range of molar ratio from 0% to 100%. Thus, different functional sites can be present to allow for orthogonal processes.

Through this copolymerisation procedure, the loading levels can be conveniently adjusted from the feed ratio in the polymerisation process and will be, preferably, higher than 1 mmol functional site/g final resin better than hitherto possible for polar resins for SPOS.

In a second aspect of the present invention, there is provided a polymer prepared by a process comprising radical polymerisation of:

(i). one or more monomer of formula (I):

(I)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being conveniently protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently hydrogen or a monomeric or oligomeric structure (branched, hyperbranched, grafted, dendritic or linear) and $R_2$ and $R_3$ optionally independently comprise a spacer molecule capable of bearing functional groups for the attachment of one or more C/MOI;

and/or one or more monomer of formula (IV)

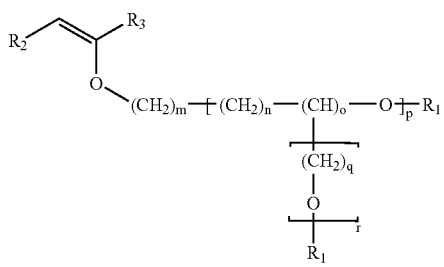

(IV)

where $R_3$ is hydrogen, $R_1$ and $R_2$ are as described before, m, n, o, p, q and r are integers; wherein: $0 \leq m \leq 3$; $0 \leq n \leq 10$; $0 \leq o \leq 8$; $1 \leq p \leq 10$; $0 \leq q \leq 10$; and $0 \leq r \leq 10$, the monomer of formula (IV) optionally being prepared using crosslinker of formula (II);

(ii). optionally one or more crosslinker, e.g. one or more crosslinker of the formula (II):

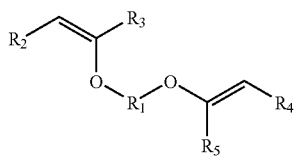

(II)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, these groups being substituted with alkyl, hydroxy, mercapto, nitro, amino, mono-, di- or trialkylamino, halogen, carboxyl, carbonyl, alkoxy or any derivatives thereof and optionally conveniently protected for the purpose of the polymerisation process; and where $R_1$ is a monomeric or oligomeric structure (branched, hyperbranched, grafted, dendritic or linear) and $R_1$ may comprise a spacer molecule capable of bearing functional groups for the attachment of one or more C/MOI and where $R_2$, $R_3$, $R_4$ and $R_5$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, these groups being substituted with alkyl, hydroxy, mercapto, nitro, amino, mono-, di- or trialkylamino, halogen, carboxyl, carbonyl, alkoxy or any derivatives thereof and optionally conveniently protected for the purpose of the polymerisation process; and where $R_2$ and $R_3$ are independently hydrogen or a monomeric or oligomeric structure (branched, hyperbranched, grafted, dendritic or linear) and $R_2$, $R_3$, $R_4$ and $R_5$ may independently comprise a spacer molecule capable of bearing functional groups for the attachment of one or more C/MOI; and (iii). one or more electron-deficient olefin of formula (V):

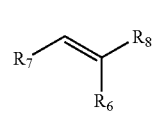

(V)

where $R_6$ is an electron withdrawing group such as carbonyl, carboxyl, carbamoyl, nitro, cyano, imino, imido, or any other similar group and derivatives thereof and where $R_7$ and $R_8$ are independently hydrogen or electron withdrawing groups such as carbonyl, carboxyl, carbamoyl, nitro, cyano, imino, imido, or any other similar group and derivatives thereof.

In this aspect, vinyl ethers as described above (structures according to formulas I, II and IV and the said structural requirements and variations) are incorporated into polymers for the said applications through the radical copolymerisation of such vinyl ethers (i.e. monomers of formula (I) and/or formula (IV)), optionally the corresponding crosslinkers (e.g. crosslinkers of formula (II)), and electron-deficient olefins according to formula (V):

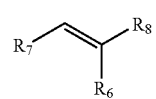

(V)

where $R_6$ is an electron withdrawing group such as carbonyl, carboxyl, carbamoyl, nitro, cyano, imino, imido, or any other similar group and derivatives thereof and where $R_7$ and $R_8$ are independently hydrogen or electron withdrawing groups such as carbonyl, carboxyl, carbamoyl, nitro, cyano, imino, imido, or any other similar group and derivatives thereof.

Examples of comonomers to be used according to formula (V) include, but are not limited by, maleic anhydride, maleic acid and esters derived from maleic acid, malemide, N-substituted maleimides, maleic bisamides, N-substituted maleic bisamides, acrylonitrile, acrolein, methyl vinylketone, cyclohex-2-enone, acrylic acid, acrylamide and N-substituted acrylamides, methacrylic acid and esters derived from methacrylic acid, cyanoacrylates and nitroethene and any derivatives thereof.

Without wishing to be bound by theory, an illustrative drawing of the network typically produced by a copolymerisation of such monomers is shown in formula (VI):

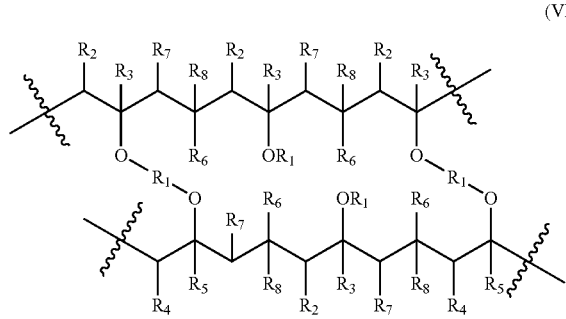

(VI)

Preferred structures for $R_1$ groups in formula (I) are, but not limited by, either monomeric or oligomeric ethers (branched, hyperbranched, grafted, dendritic or linear), and preferably $R_2$ and $R_3$ are independently hydrogen or either monomeric or oligomeric ethers (branched, hyperbranched, grafted, dendritic or linear).

Functional sites, as defined before, can be incorporated through the vinyl ether monomer as discussed before, or the comonomer according to formula (V) or both. In the latter case different functional sites can be present to allow for orthogonal processes.

In this second aspect, the monomer(s) may, for example be selected from 1,4-butanediol vinyl ether, butyl vinyl ether or any derivatives thereof containing containing groups such as alkyl, aryl, arylalkyl, substituted alkyl, substituted aryl, or substituted arylalkyl groups, these groups being substituted with alkyl or any derivatives, hydroxy, mercapto, amino, halogen, carboxyl, carbonyl and any derivatives thereof or any other group that can easily be further functionalised by reactions commonly used in organic synthesis and where these groups are, optionally, conveniently protected for the purpose of the polymerisation reaction.

In this second aspect, the monomer(s) may, for example be selected from ethyleneglycol vinyl ether, ethyl vinyl ether or any derivatives thereof containing alkyl, aryl, arylalkyl, alicylic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, conveniently protected for the purpose of the polymerisation reaction.

In this second aspect, the crosslinker(s) may, for example, be selected from 1,4-butanediol divinyl ether or any derivatives thereof containing alkyl, aryl, arylalkyl, alicylic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, conveniently protected for the purpose of the polymerisation reaction.

In this second aspect, the crosslinker(s) may, for example, be selected from ethylene glycol divinyl ether, 1,3-propanediol divinyl ether, 1,5-pentadiol divinyl ether, 1,6-hexanediol divinyl ether, 1,7-heptanediol divinyl ether, 1,8-octanediol divinyl ether, diethylene glycol divinyl ether, triethylene glycol divinyl ether, tetraethylene glycol divinyl ether or any derivatives thereof containing alkyl, aryl, arylalkyl, alicylic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, conveniently protected for the purpose of the polymerisation reaction.

Through the copolymerisation procedure of this second aspect, the loading levels can be conveniently adjusted from the feed ratio in the polymerisation process and will be, preferably, higher than 1 mmol functional site/g final resin better than hitherto possible for polar resins for SPOS.

Preferably, levels of crosslinking in this second aspect will vary between 0.5% and 10% of crosslinker (II), but other levels of crosslinking and even no crosslinking are also covered in the scope of this invention. Preferably the crosslinkers are as defined before but other crosslinkers such as, but not limited by, divinylbenzene or any other styrene-derived crosslinker are also within the scope of this invention. In one embodiment the crosslinker is selected from divinylbenzene, bisacrylates and bisacrylamides.

For the polymerisation procedure in this second aspect, monomers as described above in the desired feed ratio will typically be dissolved in an appropriate solvent for radical polymerisation, such as, but not limited by, dichloromethane, toluene, acetonitrile, xylene, chlorobenzene, anisol, tetrahydrofuran, diethyl ether, DMSO, DMF, ethanol, methanol, dioxane, diglycol ethers, water, silicones, supercritical $CO_2$ or ionic liquids.

Initiators may be any commonly used initiator for radical polymerisation such as, but not limited by, AIBN (Azoisobutyronitrile), BPO (Benzoyl peroxide), potassium persulfate and UV radiation or any other method commonly used as is known to those skilled in the art of free-radical and living free-radical polymerisation.

In this second aspect, polymerisation temperatures are normally between 0° C. and 120° C. depending on the monomers, initiators and solvents used as is known to those skilled in the art.

In this second aspect, all polymerisation procedures require the exclusion of oxygen or any other radical quencher, as commonly known in the art of free-radical or living free-radical polymerisation.

The polymers prepared according to the present invention may, be formed by copolymerisation of one or more monomers of formula (I) or (IV) in the desired ratio to produce controlled and suitable loading levels preferably up to 8.5 mmol/g.

The polymers according to the present invention may, for example, be made by bulk polymerisation.

The present invention further provides a polymer comprising a network represented by formula (III):

(III)

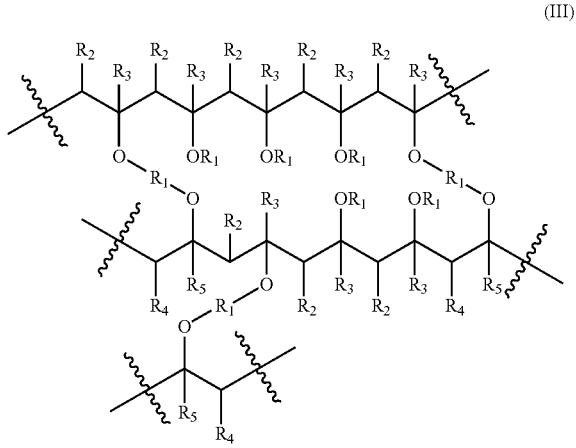

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI, and where $R_2$, $R_3$, $R_4$ and $R_5$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_2$ and $R_3$ optionally are independently a monomeric or oligomeric structure (branched, hyperbranched, grafted, dendritic or linear) and $R_2$, $R_3$, $R_4$ and $R_5$ optionally independently comprise a spacer molecule to bear functional groups for the attachment of one or more C/MOI.

The present invention still further provides a polymer comprising units represented by the formula (VII):

(VII)

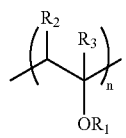

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_2$ and $R_3$ optionally are independently a monomeric or oligomeric structure (branched, hyperbranched, grafted, dendritic or linear) and $R_2$ and $R_3$ optionally independently comprise a spacer molecule capable of bearing functional groups for the attachment of one or more C/MOI.

The present invention still further provides a polymer comprising a network represented by formula (VI):

(VI)

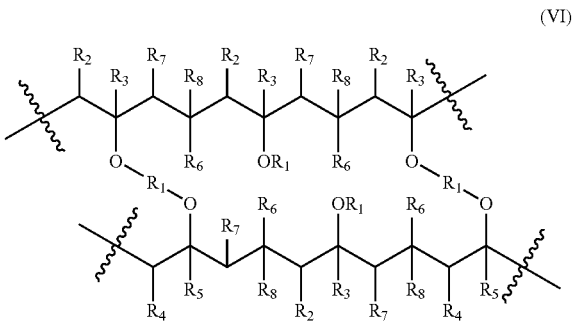

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substiututed groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$, $R_3$, $R_4$ and $R_5$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_2$ and $R_3$ optionally are independently a monomeric or oligomeric structure (branched, hyperbranched, grafted, dendritic or linear) and $R_2$, $R_3$, $R_4$ and $R_5$ optionally independently comprise a spacer molecule capable of bearing functional groups for the attachment of one or more C/MOI, where $R_6$ is an electron withdrawing group such as carbonyl, carboxyl, carbamoyl, nitro, cyano, imino, imido, any other similar group, or derivative thereof; and where $R_7$ and $R_8$ are independently hydrogen or an electron withdrawing group such as carbonyl, carboxyl, carbamoyl, nitro, cyano, imino, imido, or any other similar group, or derivative thereof.

BRIEF DESCRIPTION OF THE DRAWINGS

The present invention will now be described only by way of examples, in which reference is made to the following Figures.

Figure 1:
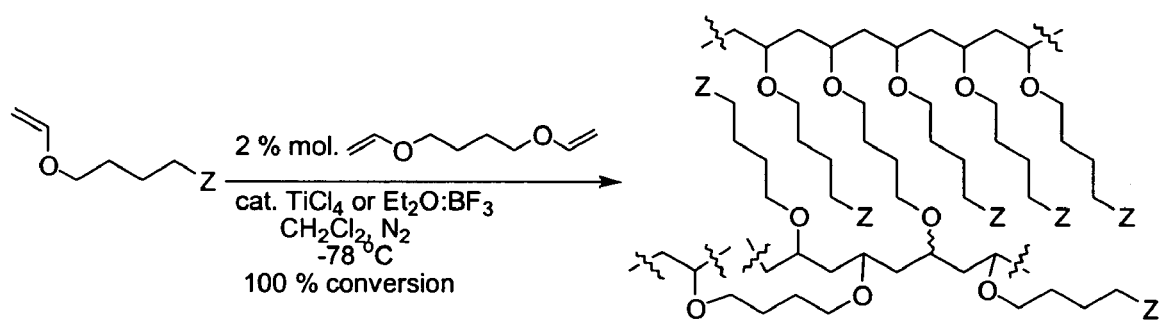
FIG. 1—which presents Reaction sequence 1.
Figure 2:
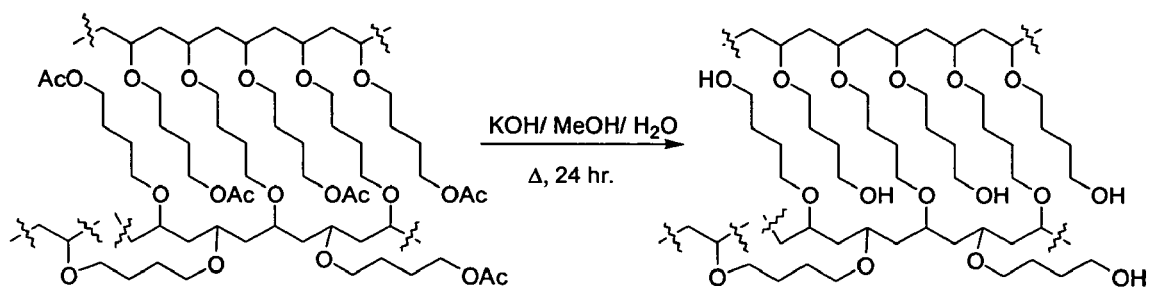
FIG. 2—which presents Reaction sequence 2.
Figure 3:
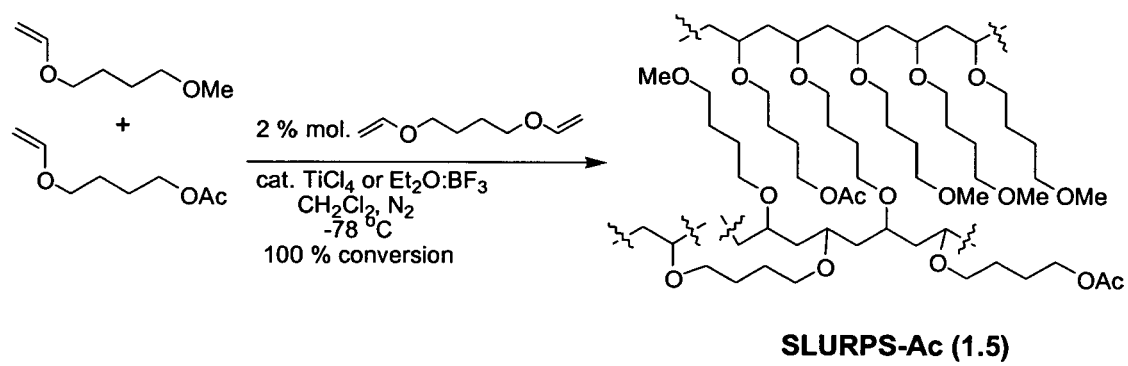
FIG. 3—which presents Reaction sequence 3.
Figure 3:
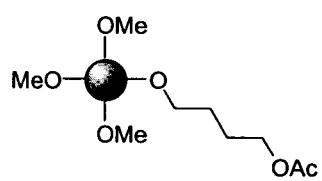
Figure 4:
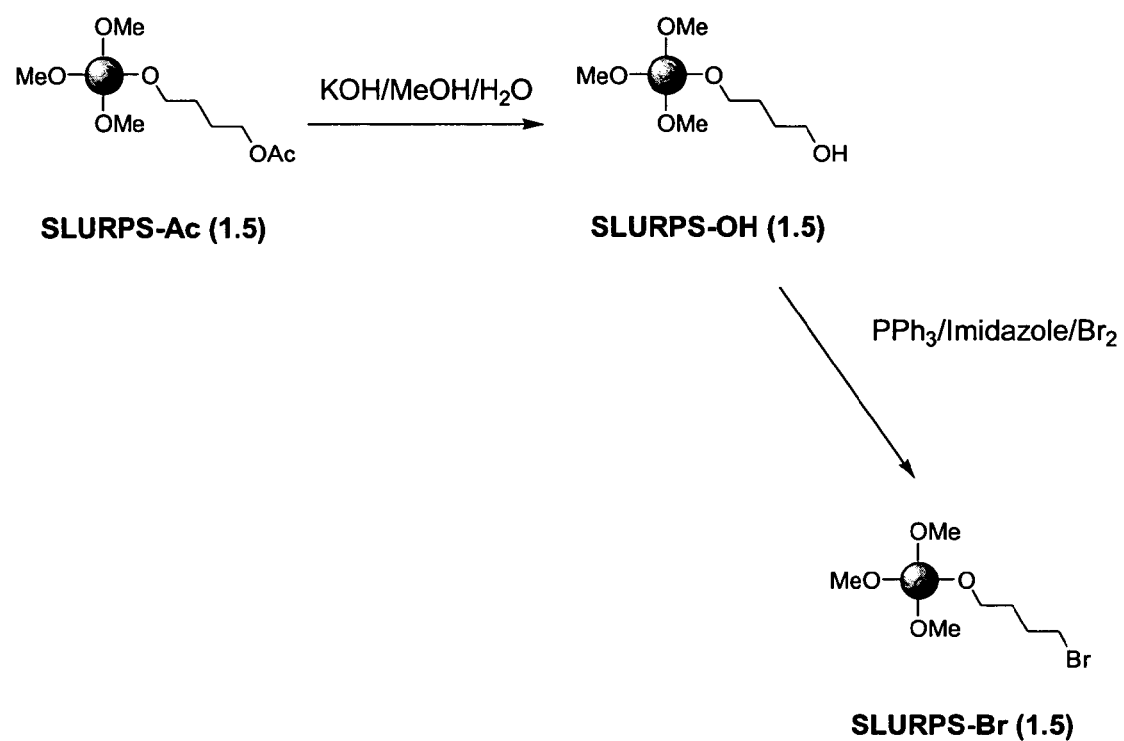
FIG. 4—which presents Reaction sequence 4.
Figure 5:
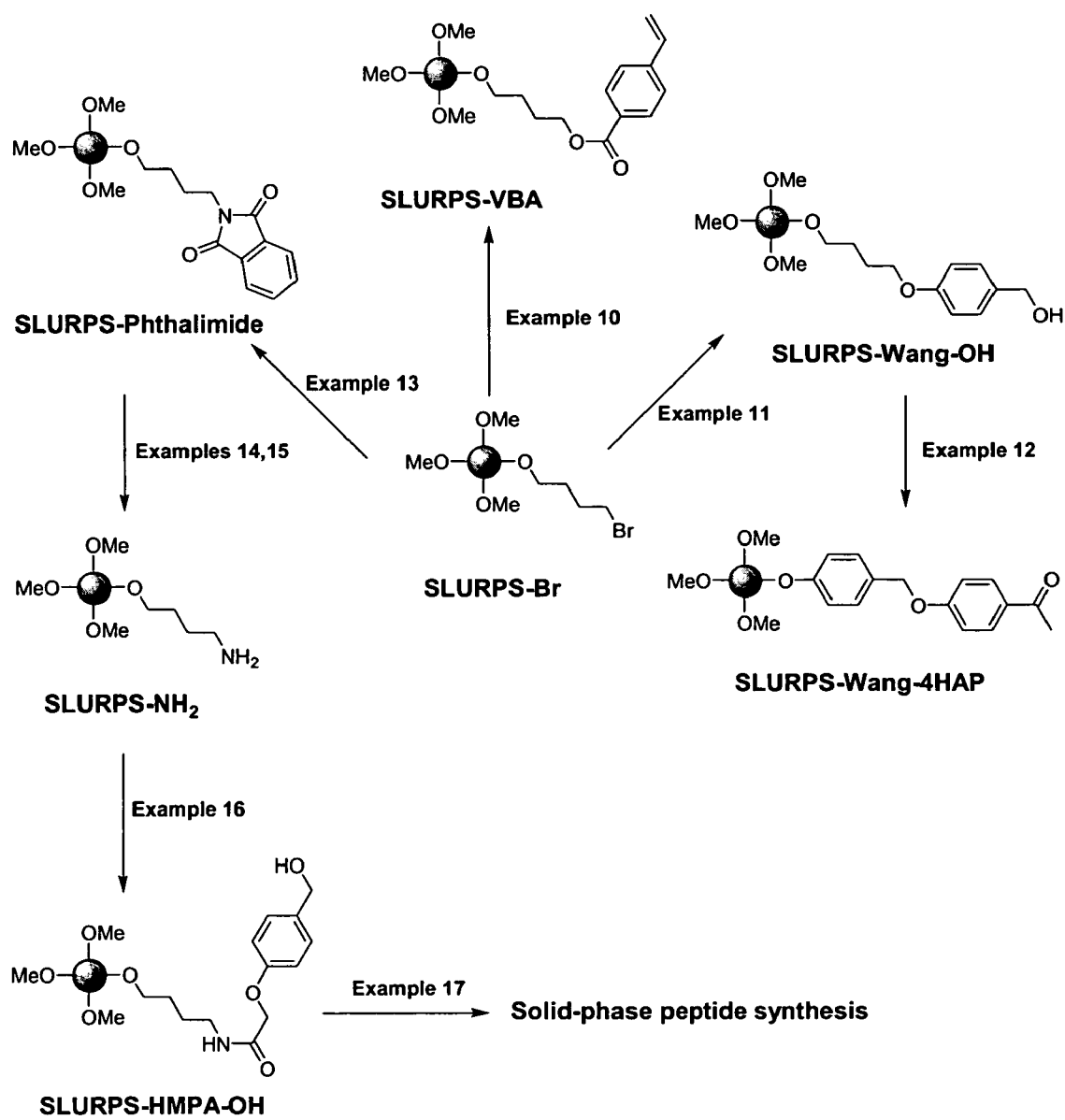
FIG. 5—which presents Reaction sequence 5.
Figure 6:
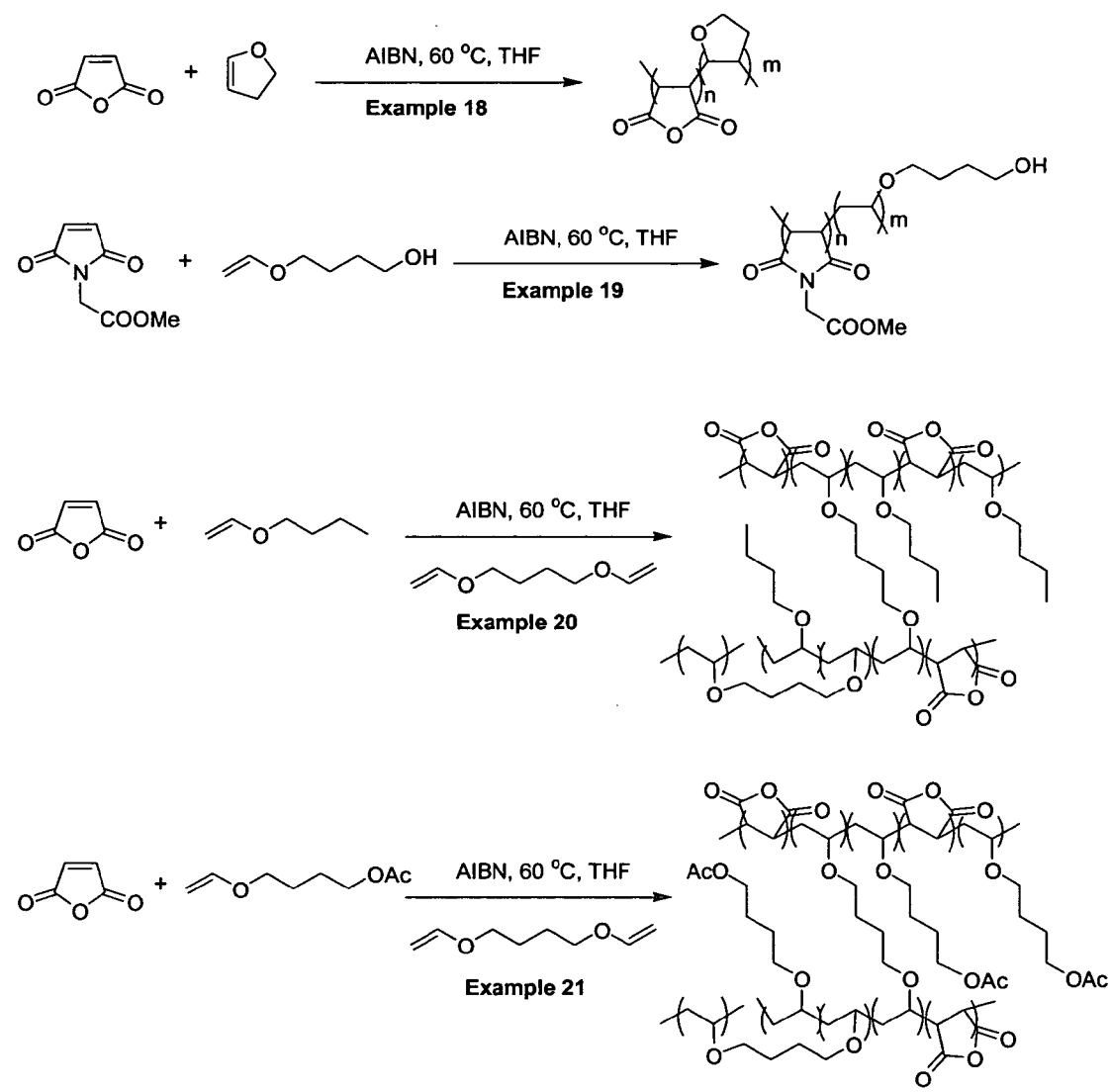
FIG. 6—which presents Reaction sequence 6.
Here:
Reaction sequence 1 illustrates Examples 1 to 3.
Reaction sequence 2 illustrates Example 4.
Reaction sequence 3 illustrates Example 7.
Reaction sequence 4 illustrates Examples 8 and 9.
Reaction sequence 5 illustrates Examples 10 to 17.
Reaction sequence 6 illustrates Examples 18 to 21.
In more detail:
Examples 1 to 6 and Example 22 concern the production of crosslinked polymers (formula III) according to the first aspect of the invention, the cationic polymerisation of vinyl ethers. The synthesis of such polymers, chemical stabilities studies and their swelling in different solvents is described.

Examples 7 to 17 concern the production of functional crosslinked polymers (formula III) according to the first aspect of the invention, the cationic polymerisation of vinyl ethers. Their post-polymerisation functionalisation to different functional groups, loading level determination and their use in solid-phase synthesis is described.

Examples 18 to 21 concern the production of crosslinked polymers (formula V) according the second aspect of the invention, the radical copolymerisation of vinyl ethers with electron-deficient olefins.

The following abbreviations are used in the Examples:

| | |
|---|---|
| 4HAP | 4-hydroxy acetophenone |
| AcBDVE | (4-Acetoxy)butyl vinyl ether |
| AIBN | Azoisobityronitrile |
| BDDVE | 1,4-Butanediol divinyl ether |
| BuVE | Butyl vinyl ether |
| DCM | dichloromethane |
| DIBAL-H | Diisopropyl aluminium hydride |
| DIPCDI | Diisopropylcarbodiimide |
| DIPEA | N,N-Diisopropyl ethyl amine |
| DMA | Poly Dimethyl acrylamide resin (Sheppard's resin) |
| DMF | N,N-dimethyl formamide |
| DMSO | dimethyl sulfoxide |
| GC | Gas chromatography |
| HMPA | 4-(hydroxymethyl)phenoxyacetic acid |
| HOBt | N-hydroxy benzotriazole |
| HPLC | High Performance Liquid Chromatography |
| IR | Infrared spectroscopy |
| m-CPBA | 3-chloro peroxybenzoic acid |
| MeBDVE | (4-Methoxy)butyl vinyl ether |
| MS | Mass spectrometry |
| NMR | Nuclear Magnetic Resonance |
| SLURPS | Superior Liquid-Uptake Resins for Polymer-supported Synthesis |
| SPOS | Solid-Phase Organic Synthesis |
| TBTU | 2-(1H-Benzotriazole-1-yl)-1,1,3,3-tetramethyluronium tetrafluoroborate |
| TFA | trifluoroacetic acid |
| THF | tetrahydrofuran |

-continued

The following abbreviations are used in the Examples:

| | |
|---|---|
| TNBS | 2,4,6-trinitrobenzenesulphonic acid |
| VBA | 4-vinyl benzoic acid |

Example 1

Cationic Polymerisation of Butyl vinyl ether (BuVE) and 1,4-butanediol divinyl ether (BDDVE)

In a dried 50 ml round-bottomed flask under nitrogen, at −78° C., dried dichloromethane (10 ml), butyl vinyl ether (BuVE) (6.871 g, 68.60 mmol) and 1,4-butanediol divinyl ether (BDDVE) (200 mg, 1.40 mmol, 2% crosslinker) were added. $TiCl_4$ (76 mg, 0.40 mmol) was added and the mixture was left standing under nitrogen for 2 hrs after gelation occurred. Afterwards, chilled $NH_3$ (35% in $H_2O$, 0.88 g/ml; 0.5 ml) in MeOH (4 ml) was added. The mixture was left to warm to room temperature, filtered and washed several times with dichloromethane, tetrahydrofuran, ethanol, acetone, ethyl acetate and diethyl ether. The final gel was dried under vacuum. The final solid is an off-white sticky solid that adheres to glass and plastics but not to metals. When swollen, the gel is very easy to handle and filter. Polymerisation under the same condition with $Et_2O:BF_3$ (57 mg, 0.40 mmol) provided a cleaner product with the same characteristics. Conversion: 100% of starting material converted to polymeric structures as monitored by NMR and GC analysis of the crude filtrate. Recovery of gel: >=70% macrogel (the remainder are microgels that were separated from the macrogel. These materials are also useful as a different format of the same supports and their synthesis can be optimised as is known to those skilled in the art). The product can be decoloured upon treatment with m-CPBA solution in dichloromethane with no changes in structure as monitored by NMR and no change in swelling properties.

$^1$H NMR (270 MHz, $CDCl_3$), δ (ppm): 3.54 (broad s, 0.4 H, CH—O); 1.56 (broad s, $CH_2$), 1.02 (broad s, $CH_3$).

$^{13}$C NMR (67.5 MHz, $CDCl_3$), δ (ppm): 73.8 (sharp, $CH_2$—O); 69.1 (backbone CH—O), 40.8 (broad, backbone $CH_2$); 32.7 (sharp, $CH_2CH_2$—O); 19.8 (sharp, $CH_2CH_2CH_2$—O); 14.2 (sharp, $CH_3$).

Example 2

Cationic Polymerisation of (4-Methoxy)butyl vinyl ether (MeBDVE) and 1,4-butanediol divinyl ether (BDDVE)

In a dried 50 ml round-bottomed flask under nitrogen, at −78° C., dried dichloromethane (10 ml), MeBDVE (8.930 g, 68.60 mmol) and BDDVE (200 mg, 1.40 mmol, 2% crosslinker) were added. $TiCl_4$ (76 mg, 0.40 mmol) was added and the mixture was left standing under nitrogen for 2 hrs after gelation occurred. Afterwards, chilled NH3 (35% in $H_2O$, 0.88 g/ml; 0.5 ml) in MeOH (4 ml) was added. The mixture was left to warm to room temperature, filtered and washed several times with dichloromethane, tetrahydrofuran, ethanol, acetone, ethyl acetate and diethyl ether. The final gel was dried under vacuum. The final solid is an off-white sticky solid that adheres to glass and plastics but not to metals. When swollen, the gel is very easy to handle and filter. Polymerisation under the same condition with $Et_2O:BF_3$ (57 mg, 0.40 mmol) provided a cleaner product with the same characteristics. Conversion: 100% of starting material converted to polymeric structures as monitored by NMR and GC analysis of the crude filtrate. Recovery of gel: >=70% macrogels (the remainder are microgels that were separated from the macrogel. These materials are also useful as a different format of the same supports and their synthesis can be optimised as is known to those skilled in the art). The product can be decoloured upon treatment with m-CPBA solution in dichloromethane with no changes in structure as monitored by NMR and no change in swelling properties.

$^1$H NMR (270 MHz, CDCl$_3$), δ (ppm): 3.46 (broad s, 1.13 H, CH—O); 1.77 (broad s, 0.96 H, CH$_2$).

$^{13}$C NMR (67.5 MHz, CDCl$_3$), δ (ppm): 73.9 (CH$_2$—O); 68.8 (broad, backbone CH—O), 58.7 (sharp, O—CH$_3$); 40.7 (broad, backbone CH$_2$); 27.2 (sharp, CH$_2$CH$_2$—O).

Example 3

Cationic Polymerisation of (4-Acetoxy)butyl vinyl ether (AcBDVE) and 1,4-butanediol divinyl ether (BDDVE):

In a dried 50 ml round-bottomed flask under nitrogen, at −78° C., dried dichloromethane (10 ml), AcBDVE (10.852 g, 68.600 mmol) and BDDVE (200 mg, 1.40 mmol, 2% crosslinker) were added. TiCl$_4$ (76 mg, 0.40 mmol) was added and the mixture was left standing under nitrogen for 2 hrs after gelation occurred. Afterwards, chilled NH$_3$ (35% in H$_2$O, 0.88 g/ml; 0.5 ml) in MeOH (4 ml) was added. The mixture was left to warm to room temperature, filtered and washed several times with dichloromethane, tetrahydrofuran, ethanol, acetone, ethyl acetate and diethyl ether. The final gel was dried under vacuum. The final solid is an off-white sticky solid that adheres to glass and plastics but not to metals. When swollen, the gel is very easy to handle and filter. Polymerisation under the same condition with Et$_2$O:BF$_3$ (57 mg, 0.40 mmol) provided a cleaner product with the same characteristics. Conversion: 100% of starting material converted to polymeric structures as monitored by NMR and GC analysis of the crude filtrate. Recovery of gel: >=70% macrogels (the remainder are microgels that were separated from the macrogel. These materials are also useful as a different format of the same supports and their synthesis can be optimised as is known to those skilled in the art). The product can be decoloured upon treatment with m-CPBA solution in dichloromethane with no changes in structure as monitored by NMR and no change in swelling properties.

$^1$H NMR (270 MHz, CDCl$_3$), δ (ppm): 4.07 (broad s, CH$_2$OAc); 3.51 (broad s, CH—O); 2.04 (broad s, COCH$_3$); 1.67 (broad s, CH$_2$).

$^{13}$C NMR (67.5 MHz, CDCl$_3$), δ (ppm): 171.1 (sharp, C=O); 73.8 (CH$_2$—O); 68.3 (broad, backbone CH—O), 64.3 (sharp, AcO—CH$_2$); 40.4 (broad, backbone CH$_2$); 26.9 (sharp, CH$_2$CH$_2$—OAc); 25.8 (sharp, CH$_2$CH$_2$—O); 21.0 (sharp, COCH$_3$).

Example 4

Synthesis of 1,4-Butanediol vinyl ether(BDVE)gel via hydrolysis of gel produced in Example 3

AcBDVE gel (see Example 3, 6.0 g, approx. 37 meq. —OAc) was suspended in a mixture of methanol/water (150 ml, 3/1 vol.) containing KOH (12.0 g, 215 mmol). The mixture was gently stirred while refluxing for 24 hrs. After that period the mixture was cooled to room temperature and filtered. The gel was washed with methanol until the filtrate was neutral. Then the gel was washed several times with THF and Et$_2$O and dried under vacuum. The final solid is sticky and adheres to glass and plastics but not to metals. When swollen, the gel is very easy to handle and filter. Conversion: 100% hydrolysis as monitored by NMR and IR.

$^1$H NMR (270 MHz, CDCl$_3$), δ (ppm): 4.61 (shoulder, CH$_2$O); 3.52 (broad s, CH—O and OH); 1.55 (broad s, CH$_2$).

$^{13}$C NMR (67.5 MHz, CDCl$_3$), δ (ppm): 78.2 (broad, CH$_2$—O); 70.0 (broad C—O); 61.9 (backbone CH—O), 40.0 (broad, weak signal, backbone CH$_2$); 29.2 (broad, CH$_2$CH$_2$—O); 26.5 (broad, CH$_2$CH$_2$—O)

Example 5

Chemical Stabilities Studies

In the first applications of these polymers for solid-phase synthesis, the polymer of choice would be the one produced by polymerisation of (4-methoxy)butyl vinyl ether (MeBDVE) as described in Example 2. This monomer would provide the structural features of the final support using some other for the functional sites. For this reason chemical stability studies were carried out using the polymer produced in Example 2.

For this purpose, the said polymer was treated with a range of common chemical reagents (>20 mmol reagent/g resin) at room temperature for 4 hr. The resin showed to be stable towards m-CPBA (sat. solution in CH$_2$Cl$_2$), aq. NaOH (2.5 M), aq. HCl (10%), DIBAL-H (1M in CH$_2$Cl$_2$), CH$_3$I, Ac$_2$O, TFA (50% volume inCH$_2$Cl$_2$), TFA and n-BuLi (2.5M in hexanes).

Example 6

Swelling Studies

To prove the fact that these polymers will provide good supports for solid-phase synthesis due to the fact that their swelling is optimal in all kinds of solvents, the polymers prepared in Examples 1-4 were studied in their swelling behaviour. Comparisons were made to a polystyrene resin (2% crosslinked with divinyl benzene) prepared in the same way as described in Examples 1 to 3. Results are shown in Table 1:

TABLE 1

Swelling studies.
Swelling ratios (ml/g)$^a$

| | Gels | | | | |
|---|---|---|---|---|---|
| Solvents | PS | (4-Methoxy) butyl vinyl ether gel | (4-Acetoxy) butyl vinyl ether gel | Butyl vinyl ether gel | 1,4-Butanediol vinyl ether gel (hydrolysed gel) |
| Hexane | 0.3 | 1.7 | 0.4 | 4.2 | 0.2 |
| Toluene | 6.3 | 11.4 | 11.1 | 7.4 | 0.4 |
| Ether | 1.4 | 6.8 | 1.6 | 6.3 | 0.2 |
| Chloroform | 6.0 | 12.7 | 21.3 | 8.1 | 1.0 |
| Ethyl Acetate | 2.9 | 7.8 | 12.5 | 5.5 | 0.6 |
| THF | 5.6 | 10.8 | 15.1 | 8.2 | 1.3 |
| Dichloromethane | 5.3 | 11.3 | 18.8 | 7.8 | 0.7 |
| Acetone | 1.3 | 7.9 | 12.7 | 2.4 | 0.8 |
| Acetonitrile | 0.4 | 4.2 | 11.6 | 0.5 | 0.5 |
| DMF | 3.2 | 6.0 | 12.4 | 0.8 | 5.6 |
| DMSO | 0.1 | 0.6 | 5.8 | 0.7 | 6.5 |

TABLE 1-continued

Swelling studies.
Swelling ratios (ml/g)$^a$

| Solvents | PS | Gels | | | |
|---|---|---|---|---|---|
| | | (4-Methoxy) butyl vinyl ether gel | (4-Acetoxy) butyl vinyl ether gel | Butyl vinyl ether gel | 1,4-Butanediol vinyl ether gel (hydrolysed gel) |
| Ethanol | 0.5 | 7.4 | 1.7 | 2.1 | 5.1 |
| Methanol | 0.4 | 7.1 | 3.2 | 1.2 | 5.3 |
| Water | 0.4 | 1.5 | 1.7 | 0.7 | 3.4 |

$^a$Pre-weighed, crushed, dry resins were left equilibrating in the corresponding solvent for a week. After filtration, the weight of incorporated solvent was measured and the swelling ratios (Sw) calculated as Sw = (Ws − Wd)/(D × Wd) where Ws: weight of swollen resin; Wd: weight of dry resin; D: density of the corresponding solvent As shown in Table 1, most gels swell better than the polystyrene (PS) gel in most solvents, especially in polar solvents. The best swelling behaviour across the whole polarity scale corresponds to MeBDVE gel (prepared in Example 2) which was thought to be the polymer of choice for the first applications in SPOS. This swelling behaviour was hitherto unknown for a polymer stable enough for SPOS and with the ability of controlling the desired loading level up to 8.5 mmol functionality/g resin. It is worth noting that for all vinyl ether supports, swelling is extremely fast once the dried gel is in contact with the corresponding solvent. This remarkable swelling behaviour (both kinetically and thermodynamically) together with the ability of producing high-loading levels supports in a controlled manner are the main characteristics of these polymers setting them apart from previously developed supports. Given the swelling characteristics of these materials we hereby name them SLURPS (Superior Liquid-Uptake Resins for Polymer-Supported Synthesis).

Example 7

Synthesis of a Functional Resin, SLURPS-Ac (Acetate protected SLURPS)

To synthesise a functional resin, MeBDVE (7.108 g, 55.00 mmol) and AcBDVE (2.215 g 14.00 mmol) were copolymerised cationically with BDDVE (2% mol crosslinker, 200 mg, 1.40 mmol) in dry dichloromethane under nitrogen at −78° C. with addition of TiCl$_4$ (76 mg, 0.4 mmol). After gelation occurred, the mixture was left standing under nitrogen for 2 hrs. Afterwards, chilled NH$_3$ (35% in H$_2$O, 0.88 g/ml; 0.5 ml) in MeOH (4 ml) was added. The mixture was left to warm to room temperature, filtered and washed several times with dichloromethane, tetrahydrofuran, ethanol, acetone, ethyl acetate and diethyl ether. The final gel was dried under vacuum. The final solid is an off-white sticky solid that adheres to glass and plastics but not to metals. When swollen, the gel is very easy to handle and filter. Polymerisation under the same condition with Et$_2$O:BF$_3$ (57 mg, 0.40 mmol) provided a cleaner product with the same characteristics. Conversion: 100% of starting material converted to polymeric structures as monitored by NMR and GC analysis of the crude filtrate. Recovery of gel: >=70% macrogels (the remainder are microgels that were separated from the macrogel. These materials are also useful as a different format of the same supports and their synthesis can be optimised as is known to those skilled in the art). The product can be decoloured upon treatment with m-CPBA solution in dichloromethane with no changes in structure as monitored by NMR and no change in swelling properties. The feed ratio chosen was to provide a 1.5 mmol/g resin when further functionalised.

Therefore, the functional resin was termed SLURPS-Ac (1.5).

(Note: in subsequent Examples the numeral in brackets shows the loading levels of the starting resin rather than the actual loading level of the corresponding resin).

NMR showed incorporation of both monomers.

Example 8

Synthesis of SLURPS-OH(1.5) by hydrolysis of SLURPS-Ac (1.5)

SLURPS-Ac (1.5) gel (5.5 g, approx. 8.0 mmol —OAc) was swollen with a mixture of EtOH/H$_2$O (120 ml, 5/1 vol), KOH (3.0 g, 53 mmol) was added and the mixture was refluxed 24 hrs with gently stirring. Afterwards, the mixture was cooled to room temperature and the gel was filtered and washed with EtOH/H$_2$O (150 ml, 2/1) until pH of filtrates was neutral. Then the gel was washed with EtOH (3×100 ml), THF (3×100 ml) and Et$_2$O (3×100 ml). The gel was dried under vacuum. Conversion to alcohol:100%. Yield: 70-100% (the reminder being microgel material).

Example 9

Synthesis of SLURPS-Br

Example 9a

Synthesis of SLURPS-Br (1.5)

SLURPS-OH (1.5)(2.0 g, 3.0 mmol aprox.) was suspended in DCM (60 ml) and treated with triphenylphosphine (4.0 g, 15 mmol) and imidazole (1.0 g, 15 mmol). After the reagents dissolved, the suspension was cooled to 10° C. in a water bath and treated dropwise with Br$_2$ (0.80 ml, 2.4 g, 15 mmol). The reaction was left stirring overnight at room temperature. The resin was filtered and washed with DMF, H$_2$O, DMF, acetone, THF and DCM (3×60 ml each) and then dried under vacuum. NMR and IR showed conversion to bromide. Elemental microanalysis showed the resin contains 1.5 mmol —Br/g exactly as planned in Example 7.

Example 9b

Synthesis of SLURPS-Br (8.5)

SLURPS-OH (8.5) as produced in Example 4 (10 g, approx. 85 mmol —OH) was suspended in DCM (350 ml) and treated with triphenylphosphine (111.5 g, 425.0 mmol) and imidazole (29.0 g, 425 mmol). After the reagents dissolved, the suspension was cooled to 10° C. in a water bath and treated dropwise with Br$_2$ (22.0 ml, 68.0 g, 425 mmol). The reaction was left stirring overnight at RT. The resin was filtered and washed with DMF, H$_2$O, DMF, acetone, THF and DCM (4×200 ml each) and then dried under vacuum. NMR and IR showed conversion to bromide.

Example 10

Synthesis of SLURPS-VBA (1.5) by attachment of 4-vinylbenzoic acid to SLURPS-Br (1.5)

Dry SLURPS-Br (1.5) (500 mg, 0.750 mmol approximately), 4-vinylbenzoic acid (VBA) (300 mg, 2.00 mmol) and $Cs_2CO_3$ (500 mg, 1.50 mmol) were mixed with dry DMF (10 ml) under $N_2$ and the mixture was warmed to 70° C. The reaction was gently stirred overnight at this temperature. After this period, the reaction mixture was cooled to RT and the resin was filtered. The resin was washed with water (3×30 ml), DMF (3×30 ml), water (3×30 ml), EtOH (3×30 ml), MeOH (3×30 ml), THF (3×30 ml), DCM (3×30 ml) and $Et_2O$ (3×30 ml) and then dried under vacuum.

Incorporation was checked by IR and by cleavage by gently heating in $K_2CO_3$/MeOH followed by filtration. The filtrate was evaporated and the residue was neutralised with diluted HCl solution. The neutralised residue was extracted with EtOAc and dried with $MgSO_4$. After that, the solvent was evaporated and the residue was dried under vacuum being the expected amount of 4-vinyl benzoic acid as monitored by NMR.

Example 11

Synthesis of SLURPS-Wang-OH (1.5) by attachment of Wang linker to SLURPS-Br (1.5)

SLURPS-Br (1.5) (1.0 g, 1.5 mmol —Br) was suspended in DMF (10 ml) and 4-hydroxybenzyl alcohol (430 mg, 3.50 mmol) was added followed by sodium methoxide (200 mg, 3.50 mmol). The suspension was heated to 80° C. with gently stirring and left at this temperature for 24 hrs. under nitrogen. After this period the resin was filtered and washed with DMF, dichloromethane, methanol, dichloromethane again, and finally $Et_2O$ (3×50 ml each time). After that the resin was dried under vacuum. Incorporation of the linker was monitored by IR (see also Example 12).

Example 12

Synthesis of SLURPS-Wang-4HAP by attachment of 4-hydroxyacetophenone to SLURPS-Wang-OH (1.5)

SLURPS-Wang-OH (1.5) (0.5 g, approx. 0.7 mmol —OH) was mixed with a solution of triphenylphosphine (0.90 g, 3.4 mmol) in THF (20 ml) at 0° C. under nitrogen. DEAD (0.40 ml, 0.40 g, 2.5 mmol) was added dropwise at the same temperature and the mixture was gently stirred for 15 minutes. A solution of 4-hydroxyacetophenone (4-HAP)(310 mg, 2.25 mmol) in THF (5 ml) was added dropwise and the mixture was gently stirred for 24 hrs. allowing it to reach room temperature. After this period the resin was filtered and washed with THF, methanol, THF again, dichloromethane, THF and finally with $Et_2O$ (3×60 ml each time). After that the resin was dried under vacuum. Incorporation of the ketone was monitored by IR.

A small fraction of the resin (50 mg) was suspended in TFA (10 ml) and left with gently stirring at room temperature for 2 hrs. 30 minutes. The resin was filtered and washed with dichloromethane (combined washings: 100 ml). The combined filtrates were evaporated and dried under vacuum. NMR and MS analysis of the residue shows the expected amount of 4-hydroxyacetophenone.

Example 13

Synthesis of SLURPS-Phthalimide from SLURPS-Br

Example 13a

Synthesis of SLURPS-Phthalimide (1.5) from SLURPS-Br (1.5)

SLURPS-Br (1.5) (10 g, 15 mmol) was suspended in a solution of potassium phthalimide (8.4 g, 45 mmol) and KI (400 mg, 2.40 mmol) in dry DMF (200 ml). The mixture was heated at 80° C. overnight under nitrogen. After this period the mixture was cooled to room temperature and the resin was filtered and washed with DMF, ethanol/water (1/1 volume), ethanol, THF, $Et_2O$ (4×100 ml each time) and then dried under vacuum. IR showed incorporation of imido bonds.

Example 13b

Synthesis of SLURPS-Phthalimide (8.5) from SLURPS-Br (8.5)

SLURPS-Br (8.5) (10 g, 85 mmol) was suspended in a solution of potassium phthalimide (47.6 g, 255 mmol) and KI (2.30 g, 13.6 mmol) in dry DMF (300 ml). The mixture was heated at 80° C. overnight under nitrogen. After this period the mixture was cooled to room temperature and the resin was filtered and washed with DMF, ethanol/water (1/1 volume), ethanol, THF, $Et_2O$ (8×100 ml each time) and then dried under vacuum. IR showed incorporation of imido bonds.

Example 14

Synthesis of SLURPS-$NH_2$ (1.5) from SLURPS-Phthalimide (1.5)

SLURPS-Phthalimide (1.5) (10 g, approx. 15 mmol) was suspended in ethanol (200 ml). Hydrazine monohydrate (2.2 ml, 2.3 g, 45 mmol) was added and the mixture was refluxed overnight with gently stirring. After this period the mixture was cooled to room temperature and the resin filtered. The resin was filtered and washed with ethanol, methanol, ethanol again, THF and $Et_2O$ (5×80 ml each time) and finally dried under vacuum. The reaction was monitored by IR.

Example 15

Synthesis of SLURPS-$NH_2$ (8.5) from SLURPS-Phthalimide (8.5)

SLURPS-Phthalimide (8.5) (2.0 g, approx. 8.1 mmol) was stirred for 3 days at room temperature in the presence of $NaBH_4$ (1.53 g, 40.5 mmol), 2-propanol (73 ml) and water (13 ml). Then acetic acid (8.5 ml) was added carefully (evolution of gas was observed) and when the foaming stopped the mixture was heated at 80° C. for 2 hours. Afterwards the resin was washed with ethanol (3×40 ml), ethanol-ammonia (3×40 ml), ethanol (3×40 ml), THF (3×40 ml) and $Et_2O$ (3×40 ml).

The resin was then dried overnight under vacuum at 40° C. The reaction was monitored by IR.

Example 16

Synthesis of SLURPS-HMPA-OH from SLURPS-NH$_2$

Example 16a

Synthesis of SLUPRS-HMPA-OH (1.5) from SLURPS-NH$_2$ (1.5)

The reaction was carried out in the same apparatus as the peptide synthesis (see following Examples) and corresponds to that described in the literature (D. A. Wellings and E. Atherton, *Methods in Enzymology*, 1997, 289, 44.). It consists of a sintered funnel of appropriate size connected to a three-way tap by PTFE tubing. The tap allows for N$_2$ bubbling (serves for stirring as well as preventing the reaction mixture to percolate through the funnel) or vacuum (filtration) to be alternative applied as considered convenient. It also connects to a flask where the liquid waste is collected by filtrating under vacuum. Quickfit connections and adapters are assembled as convenient (the three-way tap has such connections attached).

For the reaction SLURPS-NH$_2$ (1.5) (5.0 g, approx 8.3 mmol —NH$_2$) was placed in a 200 ml sintered funnel. The resin was washed with DMF three times (the volume of DMF was so that the final volume was twice the volume of the swollen resin bed) allowing for the resin to swell. A mixture of HMPA (3.80 g, 24.9 mmol), HOBt (3.20 g, 23.3 mmol) and DIPCDI (2.7 g, 3.4 ml, 21 mmol) was prepared by dissolving in a minimum amount of DMF and left to stand for 3-5 minutes and added to the filtered resin. Minimum amount of DMF was added so as to allow for N$_2$ mobility (enough DMF to produce a flexible slurry). The mixture was left for 1 hour. After that a sample of resin was tested by the Kaiser method which was negative at this stage. The resin was washed with DMF (10 times as described before) and then with Et$_2$O (10 times). The resin was dried overnight at 40° C. under vacuum. IR showed formation of amide groups.

Example 16b

Synthesis of SLURPS-HMPA-OH(8.5) from SLURPS-NH$_2$ (8.5)

The reaction was carried out in the same apparatus as the peptide synthesis (see following Examples) and corresponds to that described in the literature. It consists of a sintered funnel of appropriate size connected to a three-way tap by PTFE tubing. The tap allows for N$_2$ bubbling (serves for stirring as well as preventing the reaction mixture to percolate through the finnel) or vacuum (filtration) to be alternative applied as considered convenient. It also connects to a flask where the liquid waste is collected by filtrating under vacuum. Quickfit connections and adapters are assembled as convenient (the three-way tap has such connections attached).

For the reaction SLURPS-NH$_2$ (8.5) (1.0 g, approx. 8.5 mmol —NH$_2$) was placed in a 200 ml sintered funnel. The resin was washed with DMF three times (the volume of DMF was so that the final volume was twice the volume of the swollen resin bed) allowing for the resin to swell. A mixture of HMPA (3.80 g, 24.9 mmol), HOBt (3.20 g, 23.3 mmol) and DIPCDI (2.7 g, 3.4 ml, 21 mmol) was prepared by dissolving in a minimum amount of DMF and left to stand for 3-5 minutes and added to the filtered resin. Minimum amount of DMF was added so as to allow for N$_2$ mobility (enough DMF to produce a flexible slurry). The mixture was left for 1 hour. After that a sample of resin was tested by the Kaiser method which was negative at this stage. The resin was washed with DMF (10 times as described before) and then with Et$_2$O (10 times). The resin was dried overnight at 40° C. under vacuum. IR showed formation of amide groups.

Example 17

Solid-Phase Synthesis of Peptides Using SLURPS Resins

General Method:

The apparatus described above for the attachment of the HMPA linker (Example 16) was used for the peptide synthesis (D. A. Wellings and E. Atherton, *Methods in Enzymology*, 1997, 289, 44.). For coupling reactions the total amount of solvent used was minimum to provide enough N$_2$ mobility. During washings or deprotection reactions the total amount of solvent used each time was double the volume of the swollen bed of resin.

Peptide synthesis on SLURPS resins was compared to peptide synthesis on a DMA resin (Sheppard's resin) (DMA-HMPA-OH (0.75 mmol/g).

In all cases the following method was applied (see below for exact quantities):

Appropriate amount of resin was washed with DMF three times to make it swell.

For the first aminoacid coupling the Fmoc-protected aminoacid and catalytic amount of DMAP were dissolved in DMF. DIPCDI was added and the mixture poured onto the resin. The mixture was left at room temperature with occasional swirling (and "N$_2$-stirring") for 1 hr. After that the resin was washed with DMF (3 times). The procedure was repeated and the resin washed with DMF (10 times).

The resin was treated with Piperidine (20% v/v in DMF) for 3 minutes, then filtered and then again for 7 minutes. Then, the resin was washed with DMF (10 times) and a qualitative test for —NH$_2$ groups was carried out on a small sample of resin to check for a positive result (usually Kaiser test, but also TNBS; see below).

For subsequent aminoacids the resin was treated for 20 minutes with a preformed mixture of Fmoc-protected aminoacid, TBTU, and DIPEA. After that period Kaiser test (or TNBS) was performed on a small sample of resin to check for a negative result. In that case, the resin was washed with DMF (10 times) and treated with Piperidine (20% in DMF) for 3 minutes and again for 7 minutes. After that the resin was washed with DMF (10 times) and the Kaiser test was performed to check for a positive result.

After that the resin was washed with Et$_2$O (>5 times) and left to dry overnight under vacuum at 40° C.

In order to cleave the peptide the resin was treated for 90 minutes with a solution of TFA and Phenol (97.5/2.5% v/w), 25 ml per g of resin. After that period the resin was filtered and washed with TFA (3 times). The TFA filtrates were evaporated to yield coloured oil which was solidified by treatment with Et$_2$O to give off-white solids. The solids were further washed with Et$_2$O and dried under vacuum overnight. The crude samples were analysed by HPLC, and characterised by coelution with standards.

For HPLC analysis dry peptides were dissolved in MeCN/H$_2$O (50/50% v/v) (1 mg/ml). Analytical HPLC (AKTA Explorer, Pharmacia Biotech) was monitored at 230 nm, using Vydac 218TP54, C18 column (250×4.6 mm, 5 micron, 300 angstrom). Gradient =10-90% B in A gradient over 30 minutes at 1.5 mL/min, where A=0.1% TFA / water and B=0.1% TFA/acetonitrile. Injection=20 microlitre.

Software Used=Unicorn v 3.00.10 (APBiotech)

Kaiser test: The following three solutions were prepared: a) ninhydrin (5 g) in ethanol (100 ml); b) liquefied phenol (80 g) in ethanol (20 ml) and c) potassium cyanide aqueous solution 0.001M (2 ml) in pyridine (98 ml). Prewashed resin beads are shrunk with $Et_2O$ and filtered three times and then treated with 2-3 drops of each of the previous solutions. The mixture is mixed well and heated to 100° C. for 3-5 minutes. A positive test is indicated by deep blue resin beads (the supernatant is also deep blue).

TNBS test: Prewashed resin beads (DMF) are placed in a small sample tube and DMF is added (2 ml). A droplet of DIPEA is added and also a droplet of 2,4,6-trinitrobenzenesulphonic acid (TNBS). The suspension is left for 10 minutes at room temperature. The supernatant turns orange upon addition of the reagents. A positive test is indicated by red beads.

Example 17a

Synthesis of Leu-Enkephalin on SLURPS-HMPA-OH (1.5)

For the synthesis on SLURPS-HMPA-OH (1.5) the following quantities were used: SLURPS-HMPA-OH (1.5) (1.36 mmol/g) (1.2 g, 1.6 mmol)

$1^{st}$ amino acid attachment: Fmoc-Leu-OH (1.73 g), DIPCDI (1.02 ml) and DMAP (a tiny amount, ~20 mg). (performed twice).

Subsequent aminoacids: Fmoc-Phe-OH (1.58 g), Fmoc-Gly-OH (1.21 g), Fmoc-Gly-OH (1.21 g) and Fmoc-Tyr ($^t$But)-OH (1.88 g). TBTU (1.23 g each time) and DIPEA (0.84 ml each time).

Crude Leu-Enkephalin obtained this way was analysed by HPLC and found to be 95% pure. The same purity was found for a sample synthesised on DMA-HMPA-OH (0.75) resin.

Table 2 shows the HPLC data for SLURPS-HMPA-OH (1.5):

TABLE 2

HPLC data for Leu-Enkephalin synthesised on SLURPS-HMPA-OH (1.5) resin

| Peak | Ret. time (min) | Width (min) | Area (mAU * min) | Area/Peak area (time) % | Height (mAU) |
|---|---|---|---|---|---|
| 1 | 4.52 | 0.14 | 0.0342 | 0.06 | 0.421 |
| 2 | 5.66 | 0.15 | 0.0356 | 0.07 | 0.406 |
| 3 | 6.43 | 0.21 | 0.343 | 0.60 | 2.578 |
| 4 | 7.11 | 0.15 | 0.0422 | 0.08 | 0.49 |
| 5 | 9.65 | 0.11 | 0.2244 | 0.42 | 3.245 |
| 6 | 9.8 | 0.46 | 50.7759 | 94.51 | 504.058 |
| 7 | 10.41 | 0.19 | 0.2712 | 0.50 | 3.003 |
| 8 | 11.36 | 0.15 | 0.292 | 0.54 | 3.791 |
| 9 | 11.92 | 0.17 | 0.2464 | 0.46 | 2.917 |
| 10 | 12.72 | 0.12 | 0.0409 | 0.08 | 0.601 |
| 11 | 14.52 | 0.13 | 0.0375 | 0.07 | 0.532 |
| 12 | 14.87 | 0.17 | 0.4443 | 0.83 | 5.743 |
| 13 | 15.57 | 0.18 | 0.2401 | 0.45 | 2.889 |
| 14 | 19.21 | 0.27 | 0.1606 | 0.30 | 1.227 |
| 15 | 19.62 | 0.12 | 0.0393 | 0.07 | 0.588 |
| 16 | 19.98 | 0.21 | 0.1568 | 0.29 | 1.453 |
| 17 | 20.27 | 0.28 | 0.303 | 0.56 | 2.269 |
| 18 | 22.64 | 0.11 | 0.0362 | 0.07 | 0.505 |

Example 17b

Synthesis of Leu-Enkephalin on SLURPS-HMPA-OH (8.5)

For the synthesis on SLURPS-HMPA-OH (8.5) the following quantities were used:
SLURPS-HMPA-OH (8.5) (4.0 mmol/g) (0.5 g, 2.0 mmol)

$1^{st}$ amino acid attachment: Fmoc-Leu-OH (2.12 g), DIPCDI (1.25 ml) and DMAP (a tiny amount, ~25 mg). (performed twice).

Subsequent aminoacids: Fmoc-Phe-OH (1.94 g), Fmoc-Gly-OH (1.49 g), Fmoc-Gly-OH (1.49 g) and Fmoc-Tyr ($^t$But)-OH (2.30 g). TBTU (1.51 g each time) and DIPEA (1.03 ml each time).

Crude Leu-Enkephalin obtained this way was analysed by HPLC and found to be 79% pure. 95% purity was found for a sample synthesised on DMA-HMPA-OH (0.75) resin.

Table 3 shows the HPLC data for SLURPS-HMPA-OH (8.5):

TABLE 3

HPLC data for Leu-Enkephalin synthesised on SLURPS-HMPA-OH (8.5) resin

| Peak | Ret. time (min) | Width (min) | Area (mAU * min) | Area/Peak area (time) % | Height (mAU) |
|---|---|---|---|---|---|
| 1 | 6.24 | 0.2 | 0.3381 | 0.39 | 2.87 |
| 2 | 6.9 | 0.18 | 0.2149 | 0.25 | 2.349 |
| 3 | 8.61 | 0.2 | 0.7611 | 0.87 | 8.424 |
| 4 | 9.31 | 0.13 | 0.522 | 0.6 | 6.315 |
| 5 | 9.47 | 0.55 | 69.2412 | 78.98 | 542.055 |
| 6 | 10.11 | 0.21 | 0.914 | 1.04 | 9.528 |
| 7 | 10.39 | 0.16 | 0.211 | 0.24 | 2.098 |
| 8 | 10.68 | 0.16 | 0.2097 | 0.24 | 2.069 |
| 9 | 10.85 | 0.16 | 0.2523 | 0.29 | 2.833 |
| 10 | 11.14 | 0.21 | 1.4424 | 1.65 | 16.133 |
| 11 | 11.71 | 0.22 | 1.106 | 1.26 | 11.871 |
| 12 | 12.56 | 0.24 | 0.4116 | 0.47 | 4.133 |
| 13 | 14.73 | 0.43 | 4.969 | 5.67 | 25.053 |
| 14 | 15.26 | 0.26 | 3.1848 | 3.63 | 32.408 |
| 15 | 15.76 | 0.17 | 0.4763 | 0.54 | 4.633 |
| 16 | 15.92 | 0.14 | 0.7438 | 0.85 | 8.208 |
| 17 | 16.1 | 0.26 | 1.6975 | 1.94 | 12.109 |
| 18 | 16.45 | 0.26 | 0.4437 | 0.51 | 3.689 |
| 19 | 17.16 | 0.18 | 0.2017 | 0.23 | 2.129 |
| 20 | 23.32 | 0.18 | 0.333 | 0.38 | 3.431 |

Example 18

Synthesis of Poly[(maleic anhydride)-co-(2,3-dihydrofuran)]

THF (40 ml) was deoxygenated by bubbling $N_2$ through the solution during 30 minutes at room temperature. Maleic anhydride (1.0 g, 10 mmol), 2,3-dihydrofuran (0.70 g, 10 mmol) and AIBN (25 mg) were added to the deoxygenated solution. The solution was stirred and heated for 24 hours at 60° C. under $N_2$ atmosphere. The solution was concentrated to 7 ml in vacuo and slowly added to hexane (200 ml). The solid that precipitated was filtered by suction and dissolved again in THF (7 ml) (this procedure was repeated twice). This precipitation process was repeated using water (100 ml) instead of hexane. The filtered solid was finally dried in vacuo. Yield: 30% of final dried polymer. NMR shows 40% incorporation of maleic anhydride and 60% of 2,3-dihydrofluran.

$^1$H NMR (270 MHz, CD$_3$COCD$_3$), δ (ppm): 4.9-4.1 (m, 0.49H); 4.1-3.6 (broad s, 0.98H); 3.4-2.6 (m, 0.68H); 2.5-2.1 (broad s, 0.41H); 2.1-1.8 (broad s, 0.8H).

Example 19

Synthesis of Poly[(N-maleimido glycine methyl ester)-co-(1,4-butanediol vinyl ether)]

THF (40 ml) was deoxygenated by bubbling N$_2$ through the solution during 30 minutes at room temperature. N-Maleimido glycine methyl ester (1.7 g, 10 mmol), 1,4-butanediol vinyl ether (1.2 g, 10 mmol) and AIBN (25 mg) were added to the deoxygenated solution. The solution was stirred for 24 hours at 60° C. under N$_2$ atmosphere. The solution was concentrated to 7 ml in vacuo and slowly added to hexane (200 ml). The solid that precipitated was filtered by suction and dissolved again in THF (7 ml) (this procedure was repeated twice). This precipitation process was repeated using water (100 ml) instead of hexane. The filtered solid was finally dried in vacuo. Yield: 45% of final dried polymer. NMR shows 66% incorporation of N-maleimido glycine methyl ester and 33% of 1,4-butanediol vinyl ether.

$^1$H NMR (270 MHz, CDCl$_3$), δ (ppm): 4.20 (broad s, 0.75H); 3.71 (broad s, 0.9H), 3.54 (broad s, 0.8H); 3.2-2.4 (m, 0.6H); 2.3-1.4 (m, 1H).

Example 20

Synthesis of Poly-net-[(maleic anhydride)-co-(butyl vinyl ether)-co-(1,4-butanediol divinyl ether)]

In a sealed vial maleic anhydride (3.5 g, 35 mmol), butyl vinyl ether (3.5 g, 35 mmol) and 1,4-butanediol divinyl ether (2% mol. Crosslinker, 200 mg, 1.40 mmol) were dissolved in THF (16 ml). The reaction mixture was deoxygenated by bubbling nitrogen for 15 minutes. After that, AIBN (150 mg) dissolved in THF (2 ml) was added into the vial and the deoxygenation proceeded for 5 further minutes. Finally the sealed vial was placed in a water bath at 60° C. and left until gelation occurred and 2 more hours to ensure reaction completion. The polymer formed was filtered and washed several times (DCM, acetone, THF, ethyl acetate, hexane) and dried in vacuo. Yield of final dried gel: 66% of macrogel.

$^1$H NMR (270 MHz, CD$_3$COCD$_3$), δ (ppm): 4.05 (shoulder, CH—O); 3.54 (broad s, 0.50 H, CH—O); 1.95 (shoulder, CHCO); 1.30 (shoulder, CH$_2$C—O), 0.92 (broad, 1.6 H, CH$_2$C—O)

$^{13}$C NMR (67.5 MHz, CD$_3$COCD$_3$), δ (ppm): 171.0 (broad, C=O); 75.4 (CH—O); 69.9 (CH—O); 49.4 (broad, CH—CO); 40.2 (CH$_2$); 37.3 (CH$_2$); 34.6 (CH$_2$); 19.1(CH$_2$); 13.4 (CH$_3$)

Example 21

Synthesis of Poly-net-[(maleic anhydride)-co-(4-acetoxybutyl vinyl ether)-co-(1,4-butanediol divinyl ether)]

In a sealed vial maleic anhydride (3.5 g, 35 mmol), AcB-DVE (5.5 g, 35 mmol) and 1,4-butanediol divinyl ether (2% mol. Crosslinker, 200 mg, 1.40 mmol) were dissolved in THF (16 ml). The reaction mixture was deoxygenated by bubbling nitrogen for 15 minutes. After that, AIBN (150 mg) dissolved in THF (2 ml) was added into the vial and the deoxygenation proceeded for 5 further minutes. Finally the sealed vial was placed in a water bath at 60° C. and left until gelation occurred and 2 more hours to ensure reaction completion. The polymer formed was filtered and washed several times (DCM, acetone, THF, ethyl acetate, hexane) and dried in vacuo.

Example 22

Cationic Polymerisation of Butyl vinyl ether (BuVE) and 1,4-butanediol divinyl ether (BDDVE)

In a dried 50 ml round-bottomed flask under nitrogen, at room temperature, dried toluene (10 ml), butyl vinyl ether (BuVE) (6.871 g, 68.60 mmol) and 1,4-butanediol divinyl ether (BDDVE) (200 mg, 1.40 mmol, 2% crosslinker) were added. HI (0.1 mmol) in hexane (0.2 ml) was added followed by I$_2$ (50 mg, 0.20 mmol) and the mixture was left standing under nitrogen for 2 hrs after gelation occurred. Afterwards, chilled NH$_3$ (35% in H$_2$O, 0.88 g/ml; 0.5 ml) in MeOH (4 ml) was added. The mixture was left to warm to room temperature, filtered and washed several times with dichloromethane, tetrahydrofuran, ethanol, acetone, ethyl acetate and diethyl ether. The final gel was dried under vacuum. The final solid is an off-white sticky solid that adheres to glass and plastics but not to metals. Conversion: 100% of starting material converted to polymeric structures as monitored by NMR and GC analysis of the crude filtrate. Recovery of gel: >=70% macrogel (the remainder are microgels that were separated from the macrogel. These materials are also useful as a different format of the same supports and their synthesis can be optimised as is known to those skilled in the art).

SUMMARY ASPECTS

Some summary aspects of the present invention are now described by way of numbered paragraphs.

1. A polymer prepared by a process comprising copolymerising one or more monomer of formula (I)

(I)

where R$_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where R$_1$ optionally is a monomeric or oligomeric structure (branched, hyperbranched, grafted, dendritic or linear) and R$_1$ optionally comprises a spacer molecule capable of bearing functional groups for the attachment of one or more C/MOI and where R$_2$ and R$_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently hydrogen or a monomeric or oligomeric structure (branched, hyperbranched, grafted, dendritic or linear) and $R_2$ and $R_3$ optionally independently comprise a spacer molecule capable of bearing functional groups for the attachment of one or more C/MOI with one or more crosslinker.

2. A polymer according to paragraph 1 in which the crosslinker(s) has the formula (II):

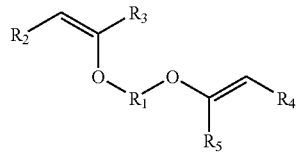

(II)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substiututed groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$, $R_3$, $R_4$ and $R_5$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently hydrogen or a monomeric or oligomeric structure (branched, hyperbranched, grafted, dendritic or linear) and $R_2$, $R_3$, $R_4$ and $R_5$ optionally independently comprise a spacer molecule capable of bearing functional groups for the attachment of one or more C/MOI.

3. A polymer according to paragraph 2 which has a network represented by formula (III):

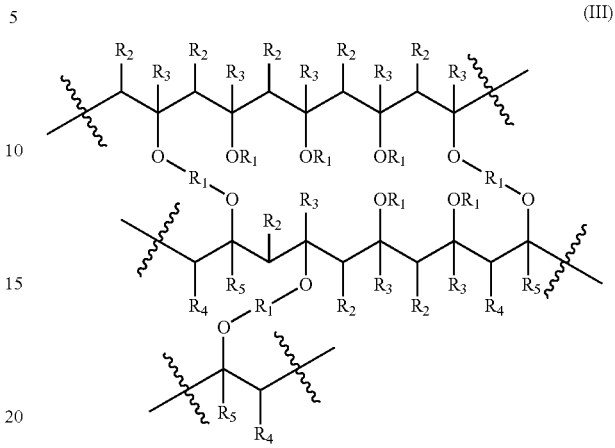

wherein $R_1$, $R_2$, $R_3$, $R_4$ and $R_5$ are as defined in paragraph 2.

4. A polymer according to any of paragraphs 1 to 3 in which $R_1$ is either monomeric or oligomeric ether (branched, hyperbranched, grafted, dendritic or linear), and $R_2$ and $R_3$ are independently hydrogen or either monomeric or oligomeric ether (branched, hyperbranched, grafted, dendritic or linear).

5. A polymer according to any of paragraphs 1 to 4 in which the monomer(s) have the formula (IV)

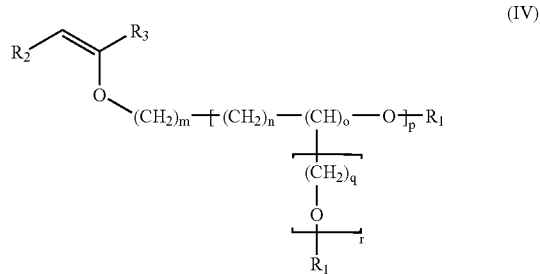

where $R_3$ is hydrogen, $R_1$ and $R_2$ are as described before, m, n, o, p, q and r are integers; wherein: $0 \leq m \leq 3$; $0 \leq n \leq 10$; $0 \leq o \leq 8$; $1 \leq p \leq 10$; $0 \leq q \leq 10$; and $0 \leq r \leq 10$ 6. A polymer according to paragraph 5 in which the monomer of formula (IV) is produced using corresponding crosslinker of formula (II).

7. A polymer according to any of paragraphs 1 to 6 which, for the incorporation of functional sites, is synthesised by a process comprising copolymerisation of:

optionally, one or more structural monomer of formula (I) or (IV) where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl, the substituted groups being substituted with alkyl or any derivatives thereof which cannot be easily further functionalised by reactions commonly used in organic synthesis, and $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl or any derivatives thereof which cannot be easily further functionalised by reactions commonly used in organic synthesis;

one or more functional monomer of formula (I) or (IV) where $R_1$ contains hydroxy, mercapto, amino, halogen, carboxyl, carbonyl and any derivatives thereof or any other group that can easily be further functionalised by reactions commonly used in organic synthesis and where these groups are, optionally, protected for the purpose of the polymerisation reaction, and $R_2$ and $R_3$ are independently hydrogen or contain hydroxy, mercapto, amino, halogen, carboxyl, carbonyl or any derivatives thereof or any other group that can easily be further functionalised by reactions commonly used in organic synthesis and where these groups are, optionally, protected for the purpose of the polymerisation reaction; and optionally, one or more crosslinker, for example, one or more crosslinker of formula (I).

8. A polymer according to any of paragraphs 1 to 7 which incorporates a functional group or spacer for the attachment of peptides, proteins, nucleotides, saccharides, small organic compounds and ligands, the functional group or spacer being selected from hydroxy, mercapto, nitro, amino, mono-, di- or trialkylamino, halogen, carboxyl, carbonyl, alkoxy or any derivatives thereof.

9. A polymer according to paragraph 8 in which the functional group or spacer is monomeric or oligomeric (branched, hyperbranched, grafted, dendritic or linear).

10. A polymer according to any of paragraphs 1 to 9 which is functionalised with an appropriate linker used for the synthesis of peptides, oligonucleotides, oligosaccharides, small organic compounds or ligands.

11. A polymer according to any of paragraphs 1 to 10 formed by copolymerisation of one or more monomers of formula (I) or (IV) in the desired ratio to produce controlled and suitable loading levels preferably up to 8.5 mmol/g.

13. 12. A polymer according to any of paragraphs 1 to 11 with a suitable level of crosslinking, preferably between 0.5% and 10% of crosslinker.

13. A polymer according to any of paragraphs 1 to 12 in which the monomer(s) are selected from 1,4-butanediol vinyl ether, butyl vinyl ether or any derivatives thereof containing alkyl, aryl, arylalkyl, substituted alkyl, substituted aryl, or substituted arylalkyl groups, these groups being substituted with alkyl, hydroxy, mercapto, amino, halogen, carboxyl, carbonyl, or any derivatives thereof, or any other group that can easily be further functionalised by reactions commonly used in organic synthesis and where these groups are, optionally, protected for the purpose of the polymerisation reaction.

14. A polymer according to any of paragraphs 1 to 12 in which the crosslinker(s) are selected from 1,4-butanediol divinyl ether or any derivatives thereof containing alkyl, aryl, arylalkyl, alicylic, heteroaryl, heterocyclic, substituted alkyl, substituted aryl, substituted alicyclic, substituted heterocyclic or substituted arylalkyl groups or any other group that can easily be further functionalised by reactions commonly used in organic synthesis and where these groups are, optionally, protected for the purpose of the polymerisation reaction.

15. A polymer according to any of paragraphs 1 to 12 in which the monomer(s) are selected from ethyleneglycol vinyl ether, ethyl vinyl ether or any derivatives thereof containing alkyl, aryl, arylalkyl, alicylic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, protected for the purpose of the polymerisation reaction.

16. A polymer according to any of paragraphs 1 to 12 in which the crosslinker(s) are selected from ethylene glycol divinyl ether, 1,3-propanediol divinyl ether, 1,5-pentadiol divinyl ether, 1,6-hexanediol divinyl ether, 1,7-heptanediol divinyl ether, 1,8-octanediol divinyl ether, diethylene glycol divinyl ether, triethylene glycol divinyl ether, tetraethylene glycol divinyl ether or any derivatives thereof containing alkyl, aryl, arylalkyl, alicylic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, protected for the purpose of the polymerisation reaction.

17. A polymer prepared by a process comprising polymerisation of one or more monomer of formula (I)

(I)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently a monomeric or oligomeric structure (branched, hyperbranched, grafted, dendritic or linear) and $R_2$ and $R_3$ optionally independently comprise a spacer molecule capable of bearing functional groups for the attachment of one or more C/MOI and comprising units of the general formula (VII):

(VII)

18. A polymer according to paragraph 17 in which $R_1$ is either monomeric or oligomeric ether (branched, hyperbranched, grafted, dendritic or linear), and $R_2$ and $R_3$ are independently hydrogen or either monomeric or oligomeric ether (branched, hyperbranched, grafted, dendritic or linear).

19. A polymer according to paragraph 17 or 18 in which the monomer(s) have the formula (IV)

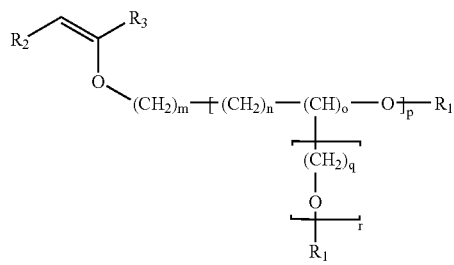

where $R_3$ is hydrogen, $R_1$ and $R_2$ are as described before, m, n, o, p, q and r are integers; wherein: $0 \leq m \leq 3$; $0 \leq n \leq 10$; $0 \leq o \leq 8$; $1 \leq p \leq 10$; $0 \leq q \leq 10$; and $0 \leq r \leq 10$.

20. A polymer according to paragraph 19 in which the monomer of formula (IV) is produced using corresponding crosslinker of formula (II)

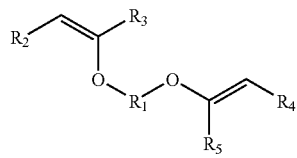

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substiututed groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$, $R_3$, $R_4$ and $R_5$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently hydrogen or a monomeric or oligomeric structure (branched, hyperbranched, grafted, dendritic or linear) and $R_2$, $R_3$, $R_4$ and $R_5$ optionally independently comprise a spacer molecule capable of bearing functional groups for the attachment of one or more C/MOI.

21. A polymer according to any of paragraphs 17 to 20 which, for the incorporation of functional sites, is synthesised by a process comprising copolymerisation of:

optionally, one or more structural monomer of formula (I) or (IV) where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl, the substituted groups being substituted with alkyl or any derivatives thereof which cannot be easily further functionalised by reactions commonly used in organic synthesis, and $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl or any derivatives thereof which cannot be easily further functionalised by reactions commonly used in organic synthesis;

one or more functional monomer of formula (I) or (IV) where $R_1$ contains hydroxy, mercapto, amino, halogen, carboxyl, carbonyl and any derivatives thereof or any other group that can easily be further functionalised by reactions commonly used in organic synthesis and where these groups are, optionally, protected for the purpose of the polymerisation reaction, and $R_2$ and $R_3$ are independently hydrogen or contain hydroxy, mercapto, amino, halogen, carboxyl, carbonyl or any derivatives thereof or any other group that can easily be further functionalised by reactions commonly used in organic synthesis and where these groups are, optionally, protected for the purpose of the polymerisation reaction; and optionally one or more crosslinker, for example, one or more crosslinker of formula (II)

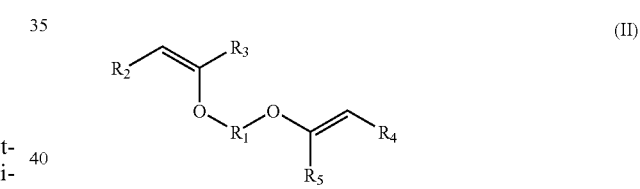

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substiututed groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$, $R_3$, $R_4$ and $R_5$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently hydrogen or a monomeric or oligomeric structure (branched, hyperbranched, grafted, dendritic or linear) and $R_2$, $R_3$, $R_4$ and $R_5$ optionally independently comprise a spacer molecule capable of bearing functional groups for the attachment of one or more C/MOI.

22. A polymer according to paragraph 21 in which the crosslinker(s) are selected from 1,4-butanediol divinyl ether or any derivatives thereof containing alkyl, aryl, arylalkyl, alicylic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, protected for the purpose of the polymerisation reaction.

23. A polymer according to paragraph 21 in which the crosslinker(s) are selected from ethylene glycol divinyl ether, 1,3-propanediol divinyl ether, 1,5-pentadiol divinyl ether, 1,6-hexanediol divinyl ether, 1,7-heptanediol divinyl ether, 1,8-octanediol divinyl ether, diethylene glycol divinyl ether, triethylene glycol divinyl ether, tetraethylene glycol divinyl ether or any derivatives thereof containing alkyl, aryl, arylalkyl, alicylic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, protected for the purpose of the polymerisation reaction.

24. A polymer according to any of paragraphs 21 to 23 with a suitable level of crosslinking, preferably between 0.5% and 10% of crosslinker.

25. A polymer according to any of paragraphs 17 to 24 which incorporates a functional group or spacer for the attachment of peptides, proteins, nucleotides, saccharides, small organic compounds and ligands, the functional group or spacer being selected from hydroxy, mercapto, nitro, amino, mono-, di- or trialkylamino, halogen, carboxyl, carbonyl, alkoxy or any derivatives thereof.

26. A polymer according to paragraph 25 in which the functional group or spacer is monomeric or oligomeric (branched, hyperbranched, grafted, dendritic or linear).

27. A polymer according to any of paragraphs 17 to 26 which is functionalised with an appropriate linker used for the synthesis of peptides, oligonucleotides, oligosaccharides, small organic compounds or ligands.

28. A polymer according to any of paragraphs 17 to 27 formed by copolymerisation of one or more monomers of formula (I) or (IV) in the desired ratio to produce controlled and suitable loadinglevels preferably up to 8.5 mmol/g.

29. A polymer according to any of paragraphs 17 to 28 in which the monomer(s) are selected from 1,4-butanediol vinyl ether, butyl vinyl ether or any derivatives thereof containing alkyl, aryl, arylalkyl, substituted alkyl, substituted aryl, or substituted arylalkyl groups, these groups being substituted with alkyl, hydroxy, mercapto, amino, halogen, carboxyl, carbonyl, or any derivatives thereof, or any other group that can easily be further functionalised by reactions commonly used in organic synthesis and where these groups are, optionally, protected for the purpose of the polymerisation reaction.

30. A polymer according to any of paragraphs 17 to 28 in which the monomer(s) are selected from ethyleneglycol vinyl ether, ethyl vinyl ether or any derivatives thereof containing alkyl, aryl, arylalkyl, alicylic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, protected for the purpose of the polymerisation reaction.

31. A polymer prepared by a process comprising radical polymerisation of:

(i). one or more monomer of formula (I)

(I)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently hydrogen or a monomeric or oligomeric structure (branched, hyperbranched, grafted, dendritic or linear) and $R_2$ and $R_3$ optionally independently comprise a spacer molecule capable of bearing functional groups for the attachment of one or more C/MOI;

and/or one or more monomer of formula (IV)

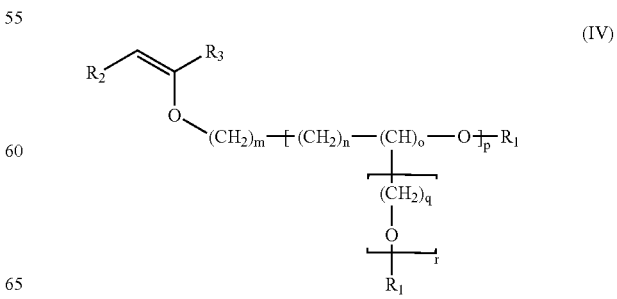

(IV)

where $R_3$ is hydrogen, $R_1$ and $R_2$ are as described before, m, n, o, p, q and r are integers; wherein: $0 \leq m \leq 3$; $0 \leq n \leq 10$; $0 \leq o \leq 8$; $1 \leq p \leq 10$; $0 \leq q \leq 10$; and $0 \leq r \leq 10$;

(ii). optionally one or more crosslinker; and (iii). one or more electron-deficient olefin of formula (V):

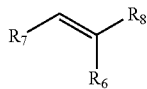

(V)

where $R_6$ is an electron withdrawing group and where $R_7$ and $R_8$ are independently hydrogen or an electron withdrawing group.

32. A polymer according to paragraph 31 in which the crosslinker(s) has the formula (II):

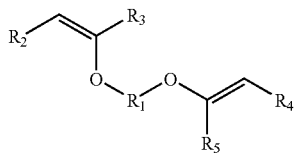

(II)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substiututed groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$, $R_3$, $R_4$ and $R_5$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently hydrogen or a monomeric or oligomeric structure (branched, hyperbranched, grafted, dendritic or linear) and $R_2$, $R_3$, $R_4$ and $R_5$ optionally independently comprise a spacer molecule capable of bearing functional groups for the attachment of one or more C/MOI.

33. A polymer according to paragraph 32 which has a network represented by formula (VI):

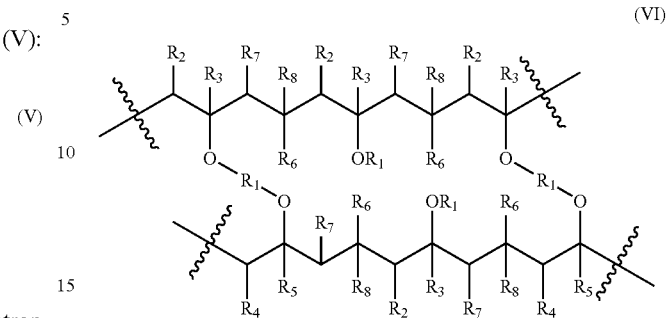

(VI)

34. A polymer according to paragraph 31 in which the crosslinker is selected from divinylbenzene, bisacrylates and bisacrylamides.

35. A polymer according to any of paragraphs 31 to 34 in which $R_1$ is either monomeric or oligomeric ether (branched, hyperbranched, grafted, dendritic or linear), and $R_2$ and $R_3$ are independently hydrogen or either monomeric or oligomeric ether (branched, hyperbranched, grafted, dendritic or linear).

36. A polymer according to any of paragraphs 31 to 35 in which the monomer of formula (IV) is produced using corresponding crosslinker of formula (II).

37. A polymer according to any of paragraphs 31 to 36 which, for the incorporation of functional sites, is synthesised by a process comprising copolymerisation of:

a structural monomer of formula (I) or (IV) where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl, the substituted groups being substituted with alkyl or any derivatives thereof which cannot be easily further functionalised by reactions commonly used in organic synthesis, and $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl or any derivatives thereof which cannot be easily further functionalised by reactions commonly used in organic synthesis;

a functional monomer of formula (I) or (IV) where $R_1$ contains hydroxy, mercapto, amino, halogen, carboxyl, carbonyl and any derivatives thereof or any other group that can easily be further functionalised by reactions commonly used in organic synthesis and where these groups are, optionally, protected for the purpose of the polymerisation reaction, and $R_2$ and $R_3$ are independently hydrogen or contain hydroxy, mercapto, amino, halogen, carboxyl, carbonyl or any derivatives thereof or any other group that can easily be further functionalised by reactions commonly used in organic synthesis and where these groups are, optionally, protected for the purpose of the polymerisation reaction; and a crosslinker of formula (II).

38. A polymer according to any of paragraphs 31 to 37 which incorporates a functional group or spacer for the attachment of peptides, proteins, nucleotides, saccharides, small organic compounds and ligands, the functional group or spacer being selected from hydroxy, mercapto, nitro, amino, mono-, di- or trialkylamino, halogen, carboxyl, carbonyl, alkoxy or any derivatives thereof.

39. A polymer according to paragraph 38 in which the functional group or spacer is monomeric or oligomeric (branched, hyperbranched, grafted, dendritic or linear).

40. A polymer according to any of paragraphs 31 to 39 which is functionalised with an appropriate linker used for the synthesis of peptides, oligonucleotides, oligosaccharides, small organic compounds or ligands.

41. A polymer according to any of paragraphs 31 to 40 formed by copolymerisation of one or more monomers of formula (I) or (IV) in the desired ratio to produce controlled and suitable loading levels preferably up to 8.5 mmol/g.

42. A polymer according to any of paragraphs 31 to 41 with a suitable level of crosslinking, preferably between 0.5% and 10% of crosslinker.

43. A polymer according to any of paragraphs 31 to 42 in which the monomer(s) are selected from 1,4-butanediol vinyl ether, butyl vinyl ether or any derivatives thereof containing alkyl, aryl, arylalkyl, substituted alkyl, substituted aryl, or substituted arylalkyl groups, these groups being substituted with alkyl, hydroxy, mercapto, amino, halogen, carboxyl, carbonyl, or any derivatives thereof, or any other group that can easily be further functionalised by reactions commonly used in organic synthesis and where these groups are, optionally, protected for the purpose of the polymerisation reaction.

44. A polymer according to any of paragraphs 31 to 42 to in which the crosslinker(s) are selected from 1,4-butanediol divinyl ether or any derivatives thereof containing alkyl, aryl, arylalkyl, alicyclic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, protected for the purpose of the polymerisation reaction.

45. A polymer according to any of paragraphs 31 to 42 in which the monomer(s) are selected from ethyleneglycol vinyl ether, ethyl vinyl ether or any derivatives thereof containing alkyl, aryl, arylalkyl, alicyclic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, protected for the purpose of the polymerisation reaction.

46. A polymer according to any of paragraphs 31 to 42 in which the crosslinker(s) are selected from ethylene glycol divinyl ether, 1,3-propanediol divinyl ether, 1,5-pentadiol divinyl ether, 1,6-hexanediol divinyl ether, 1,7-heptanediol divinyl ether, 1,8-octanediol divinyl ether, diethylene glycol divinyl ether, triethylene glycol divinyl ether, tetraethylene glycol divinyl ether or any derivatives thereof containing alkyl, aryl, arylalkyl, alicyclic, heteroaryl, heterocyclic, substituted alkyl, substituted aryl, substituted alicyclic, substituted heteroaryl, substituted heterocyclic or substituted arylalkyl groups or any other group that can easily be further functionalised by reactions commonly used in organic synthesis and where these groups are, optionally, conveniently protected for the purpose of the polymerisation reaction.

47. A polymer according to any of paragraphs 31 to 46 in which $R_6$ is an electron withdrawing group selected from carbonyl, carboxyl, carbamoyl, nitro, cyano, imino, imido, any other similar group, or derivative thereof.

48. A polymer according to any of paragraphs 31 to 47 in which $R_7$ and $R_8$ are independently an electron withdrawing group selected from carbonyl, carboxyl, carbamoyl, nitro, cyano, imino, imido, or any other similar group, or derivative thereof.

49. A polymer according to any of paragraphs 1 to 48 formed by bulk polymerisation.

50. A polymer according to any of paragraphs 1 to 48 which is a beaded crosslinked copolymer made by reverse suspension- or spray-polymerisation.

51. A polymer according to any of paragraphs 1 to 48 which is a beaded crosslinked polymer made by polymerisation of droplets in silicon oil.

52. A polymer according to any of paragraphs 1 to 48 which is a beaded crosslinked polymer made by spray-polymerisation in a hot inert gas.

53. The use of a polymer according to any of paragraphs 1 to 52 as a support for the synthesis of peptides, oligonucleotides, oligosaccharides, small organic compounds, catalysts or ligands or as a substrate for the immobilisation of proteins, ligands or catalysts.

54. The use of a polymer according to any of paragraphs 1 to 52 as a support for separation processes such as, but not limited by, affinity chromatography.

55. The use of a polymer according to any of paragraphs 1 to 52 as a support for solid-phase enzymatic reactions.

56. The use of a polymer according to paragraph 55 in which the enzyme interacts with a substrate or an inhibitor linked to the support.

57. The use of a polymer according to any of paragraphs 1 to 52 as a support for peptide, protein, DNA, or RNA ligation through a covalent, ionic, hydrogen bond or any other chemical or physical interaction.

58. The use of a polymer according to paragraph 57 in which said other chemical or physical interaction is molecular recognition, supramolecular interactions or physical trapping.

59. The use of a polymer according to any of 1 to 52 in which the use involves release of a drug bound to the support.

60. The use according to paragraph 59 in which the release is mediated by an enzyme.

61. The use of a polymer according to any of paragraphs 1 to 52 for combinatorial chemistry.

62. A process for producing a polymer according to any of paragraphs 1 to 30, which comprises dissolving monomers, in the desired feed ratio, in an appropriate solvent for cationic polymerisation of vinyl ethers, and polymerising said monomers using an initiator commonly used for cationic polymerisation of vinyl ethers.

63. A process according to paragraph 62 in which the solvent is selected from dichloromethane, 1,2-dichloroethane, toluene, acetonitrile, xylene, chlorobenzene, anisol, supercritical $CO_2$ or ionic liquids.

64. A process according to paragraph 62 or paragraph 63 in which the initiator is selected from, triflic acid, $TiCl_4$, $BF_3$—$OEt_2$, $BF_3$, $BCl_3$, $SnCl_4$, $H_2SO_4$, $HI/I_2$, $AlCl_3$, $ZnBr_2$ or any other Lewis acid.

65. A process according to any of paragraphs 62 to 64 in which one or more co-reagent is used.

66. 66. A process according to paragraph 65 in which the co-reagent is selected from tertiary amines.

67. A process according to any of paragraphs 62 to 66 in which the polymer is a crosslinked polymer and is broken and sieved post-polymerisation to the desired particle size.

68. A process according to any of paragraphs 62 to 66, which is carried out using suspension or emulsion polymerisation using inverse-phase suspension polymerisation techniques.

69. A process according to paragraph 68 in which a mineral oil is used as suspension phase, optionally with an organic co-solvent.

70. A process according to paragraph 68 or paragraph 69 which is carried out using a droplet stabiliser.

71. A process according to paragraph 70 in which the droplet stabiliser is selected from linear polymers, surfactants or detergents.

72. A polymer comprising a network represented by formula (III):

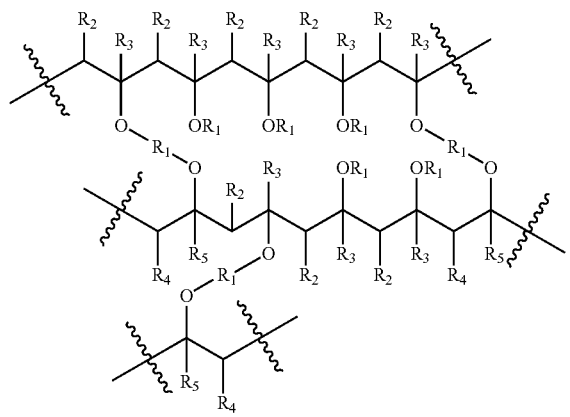

(III)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI, and where $R_2$, $R_3$, $R_4$ and $R_5$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_2$ and $R_3$ optionally are independently a monomeric or oligomeric structure (branched, hyperbranched, grafted, dendritic or linear) and $R_2$, $R_3$, $R_4$ and $R_5$ optionally independently comprise a spacer molecule to bear functional groups for the attachment of one or more C/MOI.

73. A polymer comprising units represented by the formula (VII):

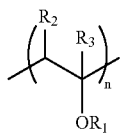

(VII)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_2$ and $R_3$ optionally are independently a monomeric or oligomeric structure (branched, hyperbranched, grafted, dendritic or linear) and $R_2$ and $R_3$ optionally independently comprise a spacer molecule capable of bearing functional groups for the attachment of one or more C/MOI.

74. A polymer a network represented by formula (VI):

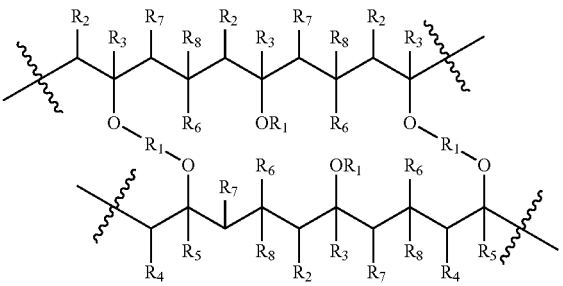

(VI)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substiututed groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$, $R_3$, $R_4$ and $R_5$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected; and where $R_2$ and $R_3$ optionally are independently a monomeric or oligomeric structure (branched, hyperbranched, grafted, dendritic or linear) and $R_2$, $R_3$, $R_4$ and $R_5$ optionally independently comprise a spacer molecule capable of bearing functional groups for the attachment of one or more C/MOI, where $R_6$ is an electron withdrawing group; and where $R_7$ and $R_8$ are independently hydrogen or an electron withdrawing group.

75. A polymer according to paragraph 74 in which $R_6$ is an electron withdrawing group preferably carbonyl, carboxyl, carbamoyl, nitro, cyano, imino, imido, any other similar group, or derivative thereof.

76. A polymer according to paragraph 74 or paragraph 75 in which $R_7$ and $R_8$ are independently an electron withdrawing group preferably carbonyl, carboxyl, carbamoyl, nitro, cyano, imino, imido, or any other similar group, or derivative thereof.

77. A polymer obtainable by a process comprising copolymerising one or more monomer of formula (I)

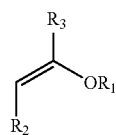

(I)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently hydrogen or a monomeric or oligomeric structure (branched, hyperbranched, grafted, dendritic or linear) and $R_2$ and $R_3$ optionally independently comprise a spacer molecule capable of bearing functional groups for the attachment of one or more C/MOI with one or more crosslinker.

78. A polymer obtainable by a process comprising polymerisation of one or more monomer of formula (I)

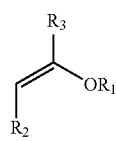

(I)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently a monomeric or oligomeric structure (branched, hyperbranched, grafted, dendritic or linear) and $R_2$ and $R_3$ optionally independently comprise a spacer molecule capable of bearing functional groups for the attachment of one or more C/MOI and comprising units of the general formula (VII):

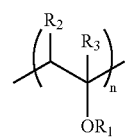

(VII)

79. A polymer obtainable by a process comprising radical polymerisation of:

(i). one or more monomer of formula (I)

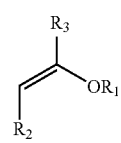

(I)

where $R_1$ is an alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_1$ optionally is a monomeric or oligomeric structure (branched, hyperbranched, grafted, dendritic or linear) and $R_1$ optionally comprises a spacer molecule capable of bearing functional groups for the attachment of one or more C/MOI and where $R_2$ and $R_3$ are independently hydrogen or alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituted groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process; and where $R_2$ and $R_3$ optionally are independently hydrogen or a monomeric or oligomeric structure (branched, hyperbranched, grafted, dendritic or linear) and $R_2$ and $R_3$ optionally independently comprise a spacer molecule capable of bearing functional groups for the attachment of one or more C/MOI;

and/or one or more monomer of formula (IV)

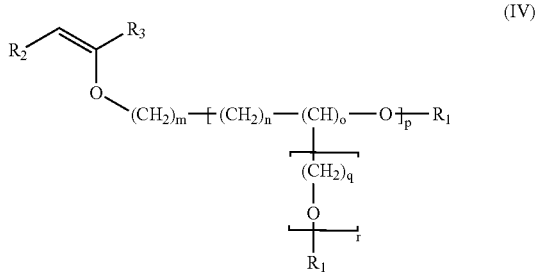

where $R_3$ is hydrogen, $R_1$ and $R_2$ are as described before, m, n, o, p, q and r are integers; wherein: $0 \leq m \leq 3$; $0 \leq n \leq 10$; $0 \leq o \leq 8$; $1 \leq p \leq 10$; $0 \leq q \leq 10$; and $0 \leq r \leq 10$;

(ii). optionally one or more crosslinker; and (iii). one or more electron-deficient olefin of formula (V):

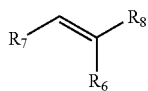

where $R_6$ is an electron withdrawing group and where $R_7$ and $R_8$ are independently hydrogen or an electron withdrawing group.

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in chemistry and biochemistry or related fields are intended to be within the scope of the following claims.

The invention claimed is:

1. A polymer obtained by a polymerization process, which polymerisation process comprises polymerising a polymerisation mixture, wherein said polymerisation mixture comprises one or more monomers of formula (I)

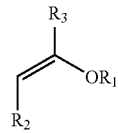

wherein $R_1$ is a hydrocarbyl group;

$R_2$ is hydrogen or a hydrocarbyl group; and $R_3$ is hydrogen or a hydrocarbyl group;

wherein at least one monomer of formula (I) is selected from 1,4-butanediol vinyl ether, and any derivatives thereof containing alkyl, aryl, arylalkyl, substituted alkyl, substituted aryl, or substituted arylalkyl groups, these groups being substituted with alkyl, hydroxyl, mercapto, amino, halogen, carboxyl, or carbonyl, and where these groups are optionally protected for the purpose of the polymerization reaction.

2. A polymer according to claim 1 wherein $R_2$ and $R_3$ are independently selected from hydrogen and an ether, which ether may be monomeric or oligomeric and/or which ether may be branched, hyperbranched, grafted, dendritic or linear.

3. A polymer according to claim 1 wherein said polymerization mixture further comprises one or more crosslinikers having the formula (II):

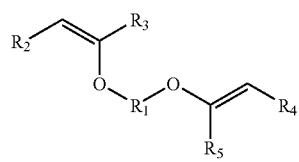

wherein $R_1$ is a hydrocarbyl group; and $R_2$, $R_3$, $R_4$ and $R_5$ are independently selected from hydrogen and a hydrocarbyl group.

4. A polymer according to claim 1 wherein said hydrocarbyl group is one or more of: alkyl, aryl, arylalkyl, alicylic, heteroaryl, heterocyclic, substituted alkyl, substituted aryl, substituted alicyclic, substituted heteroaryl, substituted heterocyclic or substituted arylalkyl group, the substituent groups being substituted with alkyl, hydroxy, mercapto, nitro, amino, mono-, di- or trialkylamino, halogen, carboxyl, carbonyl, alkoxy or any derivatives thereof and the groups optionally being protected for the purpose of the polymerisation process.

5. A polymer according to claim 1 wherein said polymer comprises one or more units of the general formula (VII):

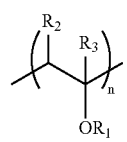

wherein $R_1$ is a hydrocarbyl group; and $R_2$ and $R_3$ are independently selected from hydrogen and a hydrocarbyl group;

wherein said units of formula VII are selected from derivatives of 1,4-butanediol vinyl ether containing alkyl, aryl, arylalkyl, substituted alkyl, substituted aryl, or substituted arylalkyl groups, these groups being substituted with alkyl, hydroxyl, mercapto, amino, halogen, carboxyl, or carbonyl, and where these groups are optionally protected for the purpose of the polymerization reaction.

6. A polymer according to claim 1 wherein at least one additional monomer of formula (I) have the formula (IV):

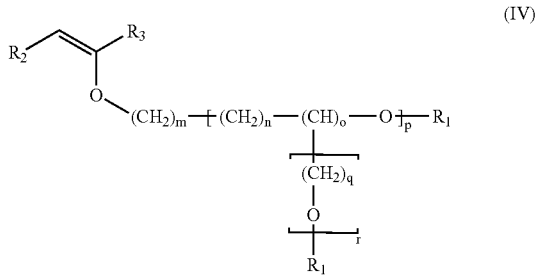

(IV)

wherein
R$_3$ is hydrogen;
R$_1$ and R$_2$ are as defined in claim 1;
m, n, o, p, q and r are integers
wherein:
0≦m≦3
0≦n≦10
0≦o≦8
0≦p≦10
0≦r≦10
0≦q≦10.

7. A polymer according to claim 1 wherein said polymerization mixture further comprises at least one electron-deficient monomer having the formula (IV):

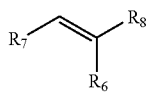

(V)

wherein
R$_6$ is an electron withdrawing group;
R$_7$ is hydrogen or an electron withdrawing group; and
R$_8$ is hydrogen or an electron withdrawing group.

8. A polymer according to claim 1 wherein said polymer is formed by bulk polymerisation.

9. A polymer according to claim 1 wherein said polymer is a beaded crossliniked copolymer made by reverse suspension- or spray-polymerisation.

10. A polymer according to claim 1 wherein said polymer is a beaded crossliniked polymer made by polymerisation of droplets in silicon oil.

11. A polymer according to claim 1 wherein said polymer has a controlled and suitable loading level up to 8.5 mmol/g.

12. A polymer according to claim 1 wherein said polymer comprises one or more functional groups or one or more spacer groups for the attachment of at least one compound/molecule of interest.

13. A polymer according to claim 1 wherein said polymer has attached thereto one or more compound/molecule of interest.

14. A process for producing a polymer according to claim 1, which process comprises dissolving appropriate monomer(s), in the desired feed ratio, in appropriate solvent(s) and polymerising said monomer(s).

15. A process for producing a polymer according to claim 1, which comprises dissolving appropriate monomer(s), in the desired feed ratio, in appropriate solvent(s) for cationic polymerisation of vinyl ethers, and polymerising said monomer(s) using initiator(s) for cationic polymerisation of vinyl ethers.

16. A method of using a polymer according to claim 1 for synthetic processes.

17. A method of using a polymer according to claim 1 for separation processes.

18. A method of using a polymer according to claim 1 for catalysis.

\* \* \* \* \*

UNITED STATES PATENT AND TRADEMARK OFFICE
CERTIFICATE OF CORRECTION

PATENT NO. : 7,491,779 B2　　　　　　　　　　　　　　　　　　　Page 1 of 1
APPLICATION NO. : 11/004194
DATED : February 17, 2009
INVENTOR(S) : Steinke et al.

It is certified that error appears in the above-identified patent and that said Letters Patent is hereby corrected as shown below:

Col. 57 lines 9-34 should read
　　　A polymer according to claim 1 wherein at least one additional monomer of formula (I) have the formula (IV)

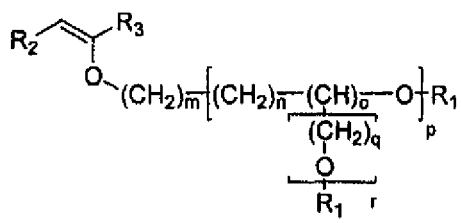

(IV)

wherein
　　$R_3$ is hydrogen;
　　$R_1$ and $R_2$ are as defined in claim 1;
　　　　m, n, o, p, q and r are integers
　　　　　　wherein:
　　　　　　$0 \leq m \leq 3$
　　　　　　$0 \leq n \leq 10$
　　　　　　$0 \leq o \leq 8$
　　　　　　--$0 \leq p \leq 10$--
　　　　　　"$1 \leq p \leq 10$"
　　　　　　$0 \leq r \leq 10$
　　　　　　$0 \leq q \leq 10$.

Signed and Sealed this

Seventh Day of April, 2009

*John Doll*

JOHN DOLL
*Acting Director of the United States Patent and Trademark Office*